(12) United States Patent
Myers et al.

(10) Patent No.: US 11,136,744 B2
(45) Date of Patent: Oct. 5, 2021

(54) VEHICLES WITH CONTROL SYSTEMS TO PERFORM VARIOUS FUNCTIONS BASED ON PAYLOAD WEIGHT AND METHODS OF OPERATING THE SAME

(71) Applicant: Deere & Company, Moline, IL (US)

(72) Inventors: David Myers, Cedar Falls, IA (US); Michael R. Gratton, Asbury, IA (US); Michael G. Kean, Maquoketa, IL (US); Todd F. Velde, Dubuque, IA (US); Dustin T. Staade, Dubuque, IA (US); Matthew Sbai, Dubuque, IA (US); Ryan Detweiler, Peosta, IA (US); Grant R. Henn, Dubuque, IA (US); Mary B. Wigginton, Dubuque, IA (US); Aaron R. Kenkel, East Dubuque, IL (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 16/669,646

(22) Filed: Oct. 31, 2019

(65) Prior Publication Data
US 2021/0131065 A1 May 6, 2021

(51) Int. Cl.
*E02F 9/20* (2006.01)
*G07C 5/02* (2006.01)
(Continued)

(52) U.S. Cl.
CPC .............. *E02F 9/2083* (2013.01); *B60Q 1/02* (2013.01); *B60Q 5/006* (2013.01); *B60Q 9/008* (2013.01);
(Continued)

(58) Field of Classification Search
CPC . E02F 9/2083; E02F 3/283; E02F 9/24; E02F 9/26; E02F 9/2025; G07C 5/085;
(Continued)

(56) References Cited

U.S. PATENT DOCUMENTS 8,825,314 B2 * 9/2014 Jensen .................. E02F 9/2079
701/50
9,834,141 B2 12/2017 Tan et al.
(Continued)

FOREIGN PATENT DOCUMENTS

DE        4431332 A1    5/1996
DE    102005009629 A1   10/2005
(Continued)

OTHER PUBLICATIONS

German Search Report issued in application No. DE102020211682.2 dated Jun. 30, 2021 (10 pages).

*Primary Examiner* — Tyler J Lee
(74) *Attorney, Agent, or Firm* — Taft Stettinius & Hollister LLP; Stephen F. Rost

(57) ABSTRACT

Vehicles and methods of operating vehicles are disclosed herein. A vehicle includes a main frame, a work implement, and a control system. The work implement is supported by the main frame and configured to carry a payload in use of the vehicle. The control system is supported by the main frame and configured to control operation of the vehicle. The control system includes a payload measurement system configured to provide payload input indicative of a variable payload carried by the work implement in use of the vehicle and a controller coupled to the payload measurement system.

20 Claims, 11 Drawing Sheets

(51) Int. Cl.

| | | |
|---|---|---|
| *B60T 7/22* | (2006.01) | |
| *B60Q 1/02* | (2006.01) | |
| *B60Q 5/00* | (2006.01) | |
| *B60T 8/18* | (2006.01) | |
| *E02F 9/24* | (2006.01) | |
| *B60T 8/171* | (2006.01) | |
| *B60T 8/32* | (2006.01) | |
| *B60T 8/58* | (2006.01) | |
| *B60Q 9/00* | (2006.01) | |
| *E02F 3/28* | (2006.01) | |
| *E02F 9/26* | (2006.01) | |
| *G07C 5/08* | (2006.01) | |

(52) U.S. Cl.
CPC ............... *B60T 7/22* (2013.01); *B60T 8/171* (2013.01); *B60T 8/18* (2013.01); *B60T 8/321* (2013.01); *B60T 8/58* (2013.01); *E02F 3/283* (2013.01); *E02F 9/2025* (2013.01); *E02F 9/24* (2013.01); *E02F 9/26* (2013.01); *G07C 5/02* (2013.01); *G07C 5/085* (2013.01); *B60Q 2300/05* (2013.01); *B60Q 2300/112* (2013.01); *B60Q 2300/132* (2013.01); *B60Q 2300/14* (2013.01); *B60Q 2300/45* (2013.01); *B60T 2250/00* (2013.01); *B60T 2250/02* (2013.01); *B60T 2250/04* (2013.01)

(58) Field of Classification Search
CPC ... G07C 5/02; B60T 8/171; B60T 8/58; B60T 8/321; B60T 8/18; B60T 7/22; B60T 2250/04; B60T 2250/02; B60T 2250/00; B60Q 5/006; B60Q 1/02; B60Q 9/008; B60Q 2300/132; B60Q 2300/05; B60Q 2300/45; B60Q 2300/14; B60Q 2300/112
See application file for complete search history.

(56) References Cited

U.S. PATENT DOCUMENTS

| | | | |
|---|---|---|---|
| 10,385,547 B2* | 8/2019 | Berry | G01L 5/16 |
| 10,401,249 B2* | 9/2019 | Steinlage | G01M 1/14 |
| 2010/0161184 A1* | 6/2010 | Marathe | E02F 9/2271 |
| | | | 701/50 |
| 2010/0312436 A1 | 12/2010 | Hartwig | |
| 2014/0039767 A1* | 2/2014 | Jensen | E02F 9/2079 |
| | | | 701/50 |
| 2014/0039772 A1* | 2/2014 | Jensen | B60K 23/0808 |
| | | | 701/69 |
| 2015/0066290 A1* | 3/2015 | Ruffner | B60Q 1/50 |
| | | | 701/33.9 |
| 2015/0159613 A1* | 6/2015 | Jensen | B60W 10/06 |
| | | | 701/68 |
| 2017/0278315 A1* | 9/2017 | Christofferson | G07C 5/0825 |
| 2018/0065629 A1* | 3/2018 | Wolff | B60L 7/12 |
| 2018/0339685 A1* | 11/2018 | Hill | B60T 8/176 |
| 2020/0157769 A1* | 5/2020 | Huff | E02F 9/207 |
| 2020/0315083 A1* | 10/2020 | Mei | B60W 50/14 |

FOREIGN PATENT DOCUMENTS

| | | |
|---|---|---|
| DE | 102005054064 A1 | 5/2007 |
| DE | 102017114917 A1 | 1/2019 |
| DE | 102018217120 A1 | 5/2019 |
| EP | 2843378 A1 | 3/2015 |

\* cited by examiner

VEHICLES WITH CONTROL SYSTEMS TO PERFORM VARIOUS FUNCTIONS BASED ON PAYLOAD WEIGHT AND METHODS OF OPERATING THE SAME

FIELD OF THE DISCLOSURE

The present disclosure relates, generally, to vehicles with work implements to carry payloads, and, more specifically, to vehicles with devices and/or systems to measure payloads carried by work implements.

BACKGROUND

Maneuverability concerns may be applicable during operation of vehicles having work implements adapted to carry payloads, such as loaders, for example. To address those concerns, it may be desirable to determine one or more characteristics of position and/or movement of a vehicle and perform various functions based on those determinations using a vehicle control system. Accordingly, provision of devices and/or systems to determine vehicle characteristics and perform vehicle functions based on those characteristics remains an area of interest.

SUMMARY

The present disclosure may comprise one or more of the following features and combinations thereof.

According to one aspect of the present disclosure, a vehicle may include a main frame, a work implement, and a control system. The work implement may be supported by the main frame and configured to carry a payload in use of the vehicle. The control system may be supported by the main frame and configured to control operation of the vehicle. The control system may include a payload measurement system configured to provide payload input indicative of a variable payload carried by the work implement in use of the vehicle and a controller coupled to the payload measurement system. The controller may include a processor and a memory device coupled to the processor that has instructions stored therein, and the instructions stored in the memory device may be executable by the processor to cause the processor to receive the payload input provided by the payload measurement system, to determine a total weight of the vehicle based at least partially on the payload input, to determine a kinetic energy of the vehicle based at least partially on the determined total weight, to determine a braking capacity of at least one brake device of the vehicle, and to calculate a stopping distance of the vehicle based on the determined kinetic energy of the vehicle and the determined brake capacity of the at least one brake device of the vehicle.

In some embodiments, the instructions stored in the memory device may be executable by the processor to cause the processor to determine the total weight of the vehicle based on the payload input and a base weight of the vehicle, to receive speed input indicative of a speed of the vehicle from at least one vehicle speed sensor, to receive orientation input indicative of an orientation of the vehicle from at least one vehicle orientation sensor, and to determine the kinetic energy of the vehicle based on the determined total weight, the received speed input, and the received orientation input. The orientation input may be indicative of a pitch of the vehicle that is defined by positional characteristics of multiple sections of the vehicle relative to a pitch axis.

In some embodiments, the control system may include a projection system coupled to the controller and configured to project light onto a surface proximate the vehicle in use thereof, and the instructions stored in the memory device may be executable by the processor to cause the processor to project light onto a surface proximate the vehicle using the projection system over a projection distance that corresponds to the calculated stopping distance. The instructions stored in the memory device may be executable by the processor to cause the processor to determine whether the total weight of the vehicle has increased based at least partially on the payload input and to selectively adjust the projection distance over which light is projected based on that determination. The instructions stored in the memory device may be executable by the processor to cause the processor to receive speed input indicative of a speed of the vehicle from at least one vehicle speed sensor, to receive orientation input indicative of an orientation of the vehicle from at least one vehicle orientation sensor, and to selectively adjust the projection distance over which light is projected based on the received speed input and the received orientation input.

In some embodiments, the control system may include an object detection system coupled to the controller and configured to provide detection input indicative of a presence of an object proximate the vehicle in use thereof, and the instructions stored in the memory device may be executable by the processor to cause the processor to determine a proximity of the vehicle to an object based on the detection input and to compare the determined proximity to the calculated stopping distance of the vehicle. The instructions stored in the memory device may be executable by the processor to cause the processor to determine whether the proximity of the vehicle to the object is within the calculated stopping distance of the vehicle based on the comparison and to selectively generate an operator alert based on that determination.

In some embodiments, the instructions stored in the memory device may be executable by the processor to cause the processor to determine a vehicle kinetic energy limit based at least partially on the determined braking capacity and a target stopping distance provided to the controller by an operator and to determine a vehicle speed limit based at least partially on the determined vehicle kinetic energy limit, the payload input provided to the controller by the payload measurement system, and orientation input provided to the controller by at least one orientation sensor that is indicative of an orientation of the vehicle. The instructions stored in the memory device may be executable by the processor to cause the processor to determine whether the total weight of the vehicle has increased and to adjust the vehicle speed limit based on that determination.

In some embodiments, the instructions stored in the memory device may be executable by the processor to cause the processor to determine the kinetic energy of the vehicle based at least partially on the payload input provided to the controller by the payload measurement system and orientation input provided to the controller by at least one orientation sensor that is indicative of an orientation of the vehicle, and to cause the processor to determine a brake capacity and/or brake metering of at least one brake device of the vehicle based on the determined kinetic energy and the calculated stopping distance of the vehicle. The instructions stored in the memory device may be executable by the processor to cause the processor to determine whether the total weight of the vehicle has increased, to determine whether a speed of the vehicle has increased, to determine whether a pitch of the vehicle has increased, and to selectively adjust the brake capacity and/or brake metering of the at least one brake device based on those determinations.

According to another aspect of the present disclosure, a method of operating a vehicle including a main frame, a work implement coupled to the main frame and configured to carry a payload, and a control system coupled to the main frame and configured to control operation of the vehicle may include (i) receiving, by a controller of the control system and from a payload measurement system of the control system, payload input indicative of a variable payload carried by the work implement, (ii) determining, by the controller and based at least partially on the payload input and a base weight of the vehicle, a total weight of the vehicle, (iii) determining, by the controller and based at least partially on the determined total weight, a kinetic energy of the vehicle, (iv) determining, by the controller, a braking capacity of at least one brake device of the vehicle, and (v) calculating, by the controller and based on the determined kinetic energy of the vehicle and the determined brake capacity of the at least one brake device of the vehicle, a stopping distance of the vehicle.

In some embodiments, the method may include (i) receiving, by the controller and from at least one vehicle speed sensor of the control system, speed input indicative of a speed of the vehicle, (ii) receiving, by the controller and from at least one vehicle orientation sensor of the control system, orientation input indicative of a pitch of the vehicle that is defined by positional characteristics of multiple sections of the vehicle relative to a pitch axis; and (iii) determining, by the controller and based on the determined total weight, the received speed input, and the received orientation input, the kinetic energy of the vehicle. Additionally, in some embodiments, the control system may include a projection system configured to project light onto a surface proximate the vehicle, and the method may include (i) projecting, by the controller and using the projection system, light onto a surface proximate the vehicle over a projection distance that corresponds to the calculated stopping distance, (ii) receiving, by the controller and from the payload measurement system, payload input provided subsequent to the stopping distance calculation, (iii) determining, by the controller and based at least partially on the payload input, whether the total weight of the vehicle has increased, (iv) adjusting, selectively by the controller and in response to the determination associated with total weight, the projection distance over which light is projected onto the surface, (v) receiving, by the controller and from at least one vehicle speed sensor of the control system, speed input indicative of a speed of the vehicle that is provided subsequent to the stopping distance calculation; (vi) determining, by the controller and based on the speed input, whether the speed of the vehicle has increased, and (vii) adjusting, selectively by the controller and in response to the determination associated with speed, the projection distance over which light is projected onto the surface.

In some embodiments, the control system may include an object detection system configured to provide detection input indicative of a presence of an object proximate the vehicle, and the method may include (i) determining, by the controller and based on the detection input, a proximity of the vehicle to an object, (ii) comparing, by the controller, the determined proximity to the calculated stopping distance of the vehicle, (iii) determining, by the controller in response to the comparison, whether the proximity of the vehicle to the object is within the calculated stopping distance, and (iv) generating, by the controller and in response to a determination that the proximity of the vehicle to the object is within the calculated stopping distance, a high priority operator alert. Additionally, in some embodiments, the method may include (i) determining, by the controller and based on the calculated stopping distance, the determined braking capacity, and a target stopping distance provided to the controller by an operator, a vehicle kinetic energy limit, (ii) receiving, by the controller and from the payload measurement system, payload input provided subsequent to the stopping distance calculation, (iii) receiving, by the controller and from at least one vehicle orientation sensor of the vehicle, orientation input indicative of an orientation of the vehicle that is provided subsequent to the stopping distance calculation, (iv) determining, by the controller and based at least partially on the determined vehicle kinetic energy limit, the received payload input, and the received orientation input, a vehicle speed limit, (v) determining, by the controller and based at least partially on the payload input, whether the total weight of the vehicle has increased, and (vi) decreasing, by the controller and in response to a determination that the total weight of the vehicle has increased, the vehicle speed limit.

In some embodiments, the method may include (i) determining, by the controller and based at least partially on payload input provided to the controller subsequent to the stopping distance calculation and orientation input provided to the controller subsequent to the stopping distance calculation that is indicative of an orientation of the vehicle, the kinetic energy of the vehicle, (ii) determining, by the controller and based on the determined kinetic energy and the calculated stopping distance of the vehicle, a brake capacity and/or brake metering of at least one brake device of the vehicle, (iii) determining, by the controller and based at least partially on the payload input, whether the total weight of the vehicle has increased, (iv) determining, by the controller and based at least partially on the orientation input, whether a pitch of the vehicle has increased, and (v) adjusting, selectively by the controller and in response to the determinations associated with the total weight of the vehicle and the pitch of the vehicle, the brake capacity and/or brake metering of the at least one brake device. The method may include (i) determining, by the controller and based on speed input provided to the controller subsequent to the stopping distance calculation, whether the speed of the vehicle has increased, and (ii) adjusting, selectively by the controller and in response to the determination associated with the speed of the vehicle, the brake capacity and/or brake metering of the at least one brake device.

According to yet another aspect of the present disclosure, a vehicle may include a main frame, a work implement, and a control system. The work implement may be supported by the main frame and configured to carry a payload in use of the vehicle. The control system may be supported by the main frame and configured to control operation of the vehicle. The control system may include a payload measurement system configured to provide payload input indicative of a variable payload carried by the work implement in use of the vehicle, at least one vehicle speed sensor configured to provide speed input indicative of a speed of the vehicle in use thereof, at least one vehicle orientation sensor configured to provide orientation input indicative of a pitch of the vehicle that is defined by positional characteristics of multiple sections of the vehicle relative to a pitch axis, and a controller coupled to the payload measurement system, the at least one vehicle speed sensor, and the at least one vehicle orientation sensor. The controller may include a processor and a memory device coupled to the processor that has instructions stored therein, and the instructions stored in the memory device may be executable by the processor to cause the processor to receive the payload input, the speed input, and the orientation input, to determine a total weight of the vehicle based on the payload input and a base weight of the vehicle, to determine a kinetic energy of the vehicle based on the determined total weight, the speed input, and the orientation input, to determine a braking capacity of at least one brake device of the vehicle, and to calculate a stopping distance of the vehicle based on the determined kinetic energy of the vehicle and the determined brake capacity of the at least one brake device of the vehicle These and other features of the present disclosure will become more apparent from the following description of the illustrative embodiments.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION

Figure 1:
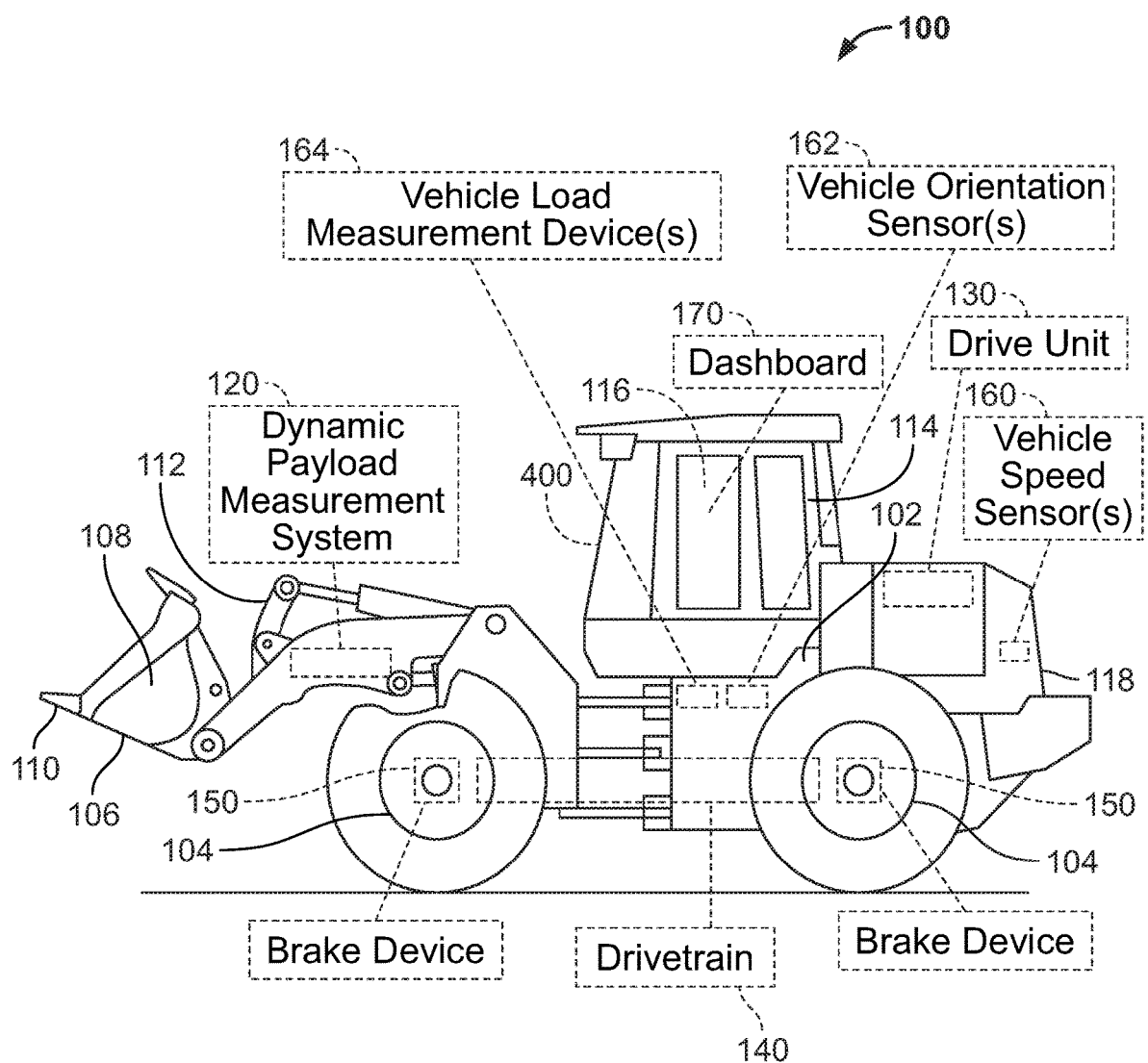
FIG. 1 is a side elevation view of a loader equipped with a dynamic payload measurement system.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, an illustrative vehicle or work machine 100 is embodied as, or otherwise includes, a main frame 102 that is supported for movement by wheels 104. In the illustrative embodiment, the vehicle 100 includes a work implement 106 that is supported by the main frame 102 and configured to carry a payload in use of the vehicle 100. The illustrative work implement 106 is embodied as, or otherwise includes, a loader bucket 108 arranged at a front end 110 of the vehicle 100. In some embodiments, the work implement 106 may be embodied as, or otherwise include, a front-end loader.

In the illustrative embodiment, the work implement 106 is movably coupled to the main frame 102 by an articulation mechanism 112 to permit movement of the work implement 106 relative to the main frame 102 in use of the vehicle 100. The articulation mechanism 112 may include one or more boom elements, arms, rockers, linkages, saddles, hydraulic cylinders, mounting brackets, articulation joints, rods, bars, pivot pins, and/or the like. In use of the vehicle 100, kinematic characteristics of one or more components of the articulation mechanism 112 may be measured to evaluate performance of the vehicle 100. In the illustrative embodiment, the vehicle 100 includes a dynamic payload measurement system 120 that is coupled to the articulation mechanism 112 and configured to provide payload input indicative of a variable payload carried by the work implement 106 in use of the vehicle 100.

The illustrative vehicle 100 includes a vehicle control system 400 (see FIG. 4) that is supported by the main frame 102 and configured to control operation of the vehicle 100. The illustrative control system 400 includes the payload measurement system 120 and a controller 402 coupled to the payload measurement system 120. The controller 402 includes a processor 404 and a memory device 406 coupled to the processor 404 that has instructions stored therein. In the illustrative embodiment, as described in greater detail below with reference to FIG. 6, the instructions stored in the memory device 406 are executable by the processor 404 to cause the processor 404 to receive the payload input provided by the payload measurement system 120, to determine a total weight of the vehicle 100 based at least partially on the payload input, to determine a kinetic energy of the vehicle 100 based at least partially on the determined total weight, to determine a braking capacity of at least one brake device (e.g., one of the brake devices 150) of the vehicle 100, and to calculate a vehicle stopping distance VSD (see FIGS. 2 and 3) of the vehicle 100 based on the determined kinetic energy of the vehicle 100 and the determined brake capacity of the at least one brake device of the vehicle 100.

The illustrative control system 400 is configured to perform a number of functions based on, or otherwise in view of, the calculated vehicle stopping distance VSD. In one example, as described in greater detail below with reference to FIGS. 2 and 7, the control system 400 is configured to project light onto a surface S proximate the vehicle 100 over a projection distance PD that corresponds to the calculated vehicle stopping distance VSD to alert an operator, pedestrian, or bystander to the travel path of the vehicle 100. In another example, as described in greater detail below with reference to FIGS. 3 and 8, the control system 400 is configured to determine a proximity of the vehicle 100 to an object, compare the determined proximity to the calculated vehicle stopping distance VSD, and selectively generate an alert to inform the operator of the detected object. In yet another example, as described in greater detail below with reference to FIGS. 9 and 10, the control system 400 is configured to determine and implement a vehicle speed limit based on, or otherwise in view of, the calculated stopping distance VSD such that the vehicle 100 stops within a predetermined and/or reference distance. In yet another example still, as described in greater detail below with reference to FIGS. 11 and 12, the control system 400 is configured to control braking capacity and metering of the brake devices of the vehicle 100 based on, or otherwise in view of, the calculated stopping distance VSD to provide adaptive brake metering for a particular payload.

The illustrative payload measurement system 120 is embodied as, or otherwise includes, a device or collection of devices capable of measuring the mass or weight of a payload carried by the work implement 106. In some embodiments, the payload measurement system 120 may include one or more sensing devices, such as one or more accelerometers formed as multi-axis (e.g., three axis) gyroscopes and one or more pressure sensors, for example. In such embodiments, payload input provided by the sensing devices may be associated with operational characteristics of the articulation mechanism 112, the work implement 106, and the main frame 102, such as roll, pitch, and/or yaw of the mechanism 112, the work implement 106, and the main frame 102 measured relative to an inertial reference frame, for example. When operated by a control system (e.g., the control system 400) in a particular application, the mass or weight of a payload particular to the application may be determined by the control system based on the payload input provided by the payload measurement system 120. In some embodiments, the payload measurement system 120 may be substantially similar to the weighing device, associated components, and associated measurement scheme disclosed in European Publication No. EP2843378A1 (hereinafter "the incorporated reference"), the disclosure of which is hereby incorporated by reference in its entirety.

In the illustrative embodiment, the vehicle 100 includes a drive unit 130, a drivetrain 140, and brake devices 150. The drive unit 130 is illustratively embodied as, or otherwise includes, any device or collection of devices (e.g., one or more engine(s), powerplant(s), or the like) capable of supplying rotational power to the drivetrain 140 and other components, as the case may be, to drive operation of those components. The drivetrain 140 is illustratively embodied as, or otherwise includes, any device or collection of devices (e.g., one or more transmission(s), differential(s), axle(s), or the like) capable of transmitting rotational power provided by the drive unit 130 to the wheels 104 to drive movement of the vehicle 100. Each of the brake devices 150 is illustratively embodied as, or otherwise includes, any device or collections of devices (e.g., one or more friction element(s) or the like) capable of braking the wheels 104 to arrest movement of the vehicle 100.

In the illustrative embodiment, the vehicle 100 includes one or more vehicle speed sensor(s) 160, one or more vehicle orientation sensor(s) 162, and one or more vehicle load measurement device(s) 164. The one or more vehicle speed sensor(s) 160 are each embodied as, or otherwise include, any device or collection of devices capable of providing speed input indicative of a speed of the vehicle 100. The one or more vehicle orientation sensor(s) 162 are each embodied as, or otherwise include, any device or collection of devices capable of providing orientation input indicative of an orientation of the vehicle 100. The one or more vehicle load measurement device(s) 164 are each embodied as, or otherwise include, any device or collection of devices capable of providing load input indicative of a base weight of the vehicle 100 that may not account for any payload carried by the work implement 106. In some embodiments, the one or more vehicle load measurement device(s) 164 may be omitted and the base weight of the vehicle 100 may be a parameter included in the instructions stored in the memory device 406 of the controller 402.

In the illustrative embodiment, the vehicle 100 includes an operator cab 114 that is supported by the main frame 102 and defines an operator cabin 116 in which various operational controls for the vehicle 100 are provided. A dashboard 170 positioned in the operator cabin 116 provides a control interface for the operator(s) positioned in the cabin 116. The illustrative dashboard 170 is configured to provide alerts to the operator based on, in view of, or otherwise associated with, the calculated vehicle stopping distance VSD. Additionally, using the dashboard 170, the operator may provide user inputs to the control system 400.

The illustrative vehicle 100 may be embodied as, or otherwise include, a wheeled loader. In some embodiments, the vehicle 100 may be embodied as, or otherwise include, any one of the following vehicles manufactured by John Deere: a 204L wheel loader, a 244L wheel loader, a 304L wheel loader, a 324L wheel loader, a 344L wheel loader, a 444L wheel loader, a 524L wheel loader, a 544L wheel loader, a 624L wheel loader, a 644L wheel loader, a 644L hybrid wheel loader, a 724L wheel loader, a 744L wheel loader, a 824L wheel loader, a 844L wheel loader, or a 944K hybrid wheel loader. Additionally, in some embodiments, the vehicle 100 may be embodied as, or otherwise include, a 210L tractor loader or a 210L EP tractor loader, each of which is manufactured by John Deere. Of course, it should be appreciated that in other embodiments, the vehicle 100 may be embodied as, or otherwise include, another suitable vehicle or work machine.

In some embodiments, such as those in which the work implement 106 is embodied as, or otherwise includes, a front-end loader, for example, the work implement 106 may be any one of the following manufactured by John Deere: a D120 loader, a 120R loader, a 220R loader, a 300E loader, a 300R loader, a 320R loader, a 400E loader, a 440R loader, a H310 loader, a 512 NSL loader, a 520M loader, a 540M loader, a 540R loader, a 600R loader, a 620R loader, a 640R loader, a 660R loader, a 680R loader, and a H480 loader. Of course, it should be appreciated that in other embodiments, the work implement 106 may be embodied as, or otherwise include, another suitable device.

The illustrative vehicle 100 is adapted for use in one or more construction applications. However, in some embodiments, the vehicle 100 may be adapted for use in other applications. For example, in some embodiments, the vehicle 100 may be embodied as, included in, or otherwise adapted for use with, equipment used in agricultural, lawn and garden, landscaping and ground care, golf and sports turf, forestry, engine and drivetrain, or government and military applications. In such embodiments, the vehicle 100 of the present disclosure may be embodied as, or otherwise adapted for use with, a tractor, a scraper system, a cutter, a shredder, hay and forage equipment, planting equipment, seeding equipment, a sprayer, an applicator, a utility vehicle, a mower, a dump truck, a backhoe, a track loader, a crawler loader, a dozer, an excavator, a motor grader, a skid steer, a rake, an aerator, a skidder, a buncher, a forwarder, a harvester, a swing machine, a knuckleboom loader, a diesel engine, an axle, a planetary gear drive, a pump drive, a transmission, a generator, or a marine engine, among other suitable equipment.

Figure 2:
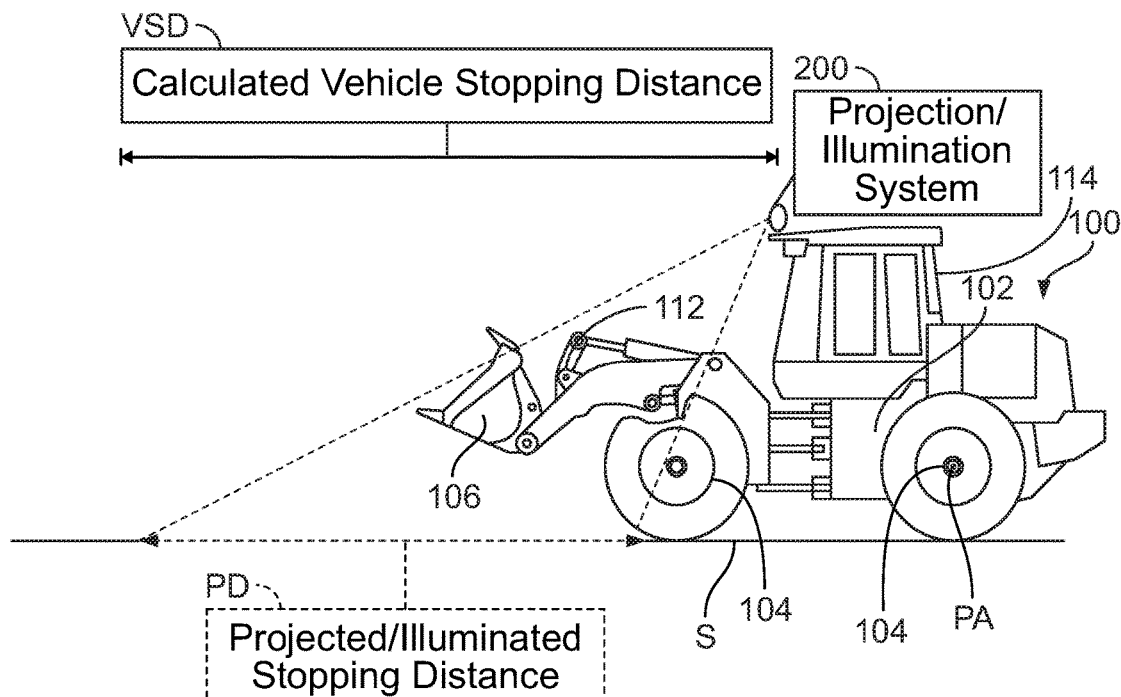
FIG. 2 is side view of the loader of FIG. 1 depicting a projection/illumination system thereof that is adapted to project light onto a surface proximate the loader.

Referring now to FIG. 2, the illustrative vehicle 100 includes a projection/illumination system 200 that is supported by the main frame 102 and coupled to the controller 402. The projection/illumination system 200 may be arranged atop the operator cab 114 or at any other suitable location on the vehicle 100. In any case, the projection/illumination system 200 is embodied as, or otherwise include, any device or collection of devices configured to project light onto a surface S proximate the vehicle 100 in use thereof. More specifically, under control by the controller 402, the projection/illumination system 200 is configured to project light onto the surface S over the projection distance PD. As depicted in FIG. 2, the projection distance PD substantially corresponds to the calculated vehicle stopping distance VSD. As described in greater detail below with reference to FIG. 7, the projection distance PD may be adjusted by the controller 402 based on the calculated vehicle stopping distance VSD.

Figure 3:
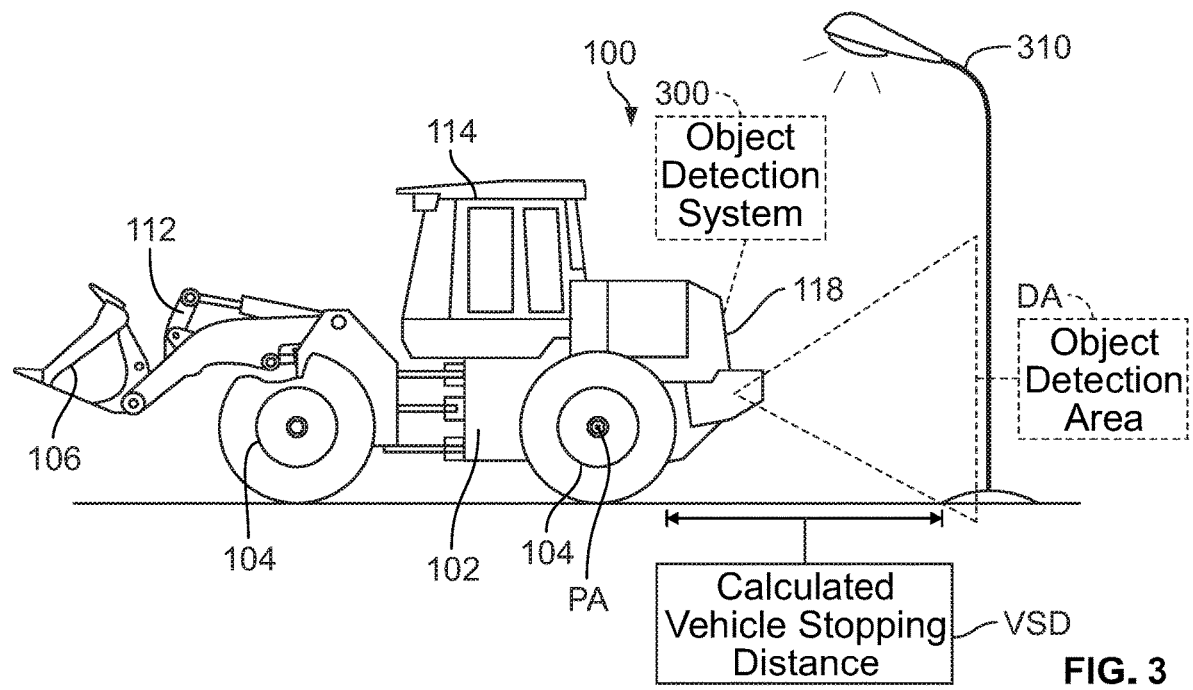
FIG. 3 is a side view of the loader of FIG. 1 depicting an object detection system thereof that is adapted to detect objects in proximity to the vehicle.

Referring now to FIG. 3, the illustrative vehicle 100 includes an object detection system 300 that is supported by the main frame 102 and coupled to the controller 402. The object detection system 300 may be arranged at a rear end 118 of the vehicle 100 or at any other suitable location on the vehicle 100. In any case, the object detection system 300 is embodied as, or otherwise includes, any device or collection of devices configured to provide detection input indicative of a presence of an object (e.g., an object 310) within an object detection area DA that is proximate the vehicle 100 in use thereof. As described in greater detail below with reference to FIG. 8, based on the detection input provided by the object detection system 300 and the vehicle stopping distance VSD calculated by the controller 402, the controller 402 may alert an operator to the presence of an object within the calculated vehicle stopping distance VSD.

Figure 4:
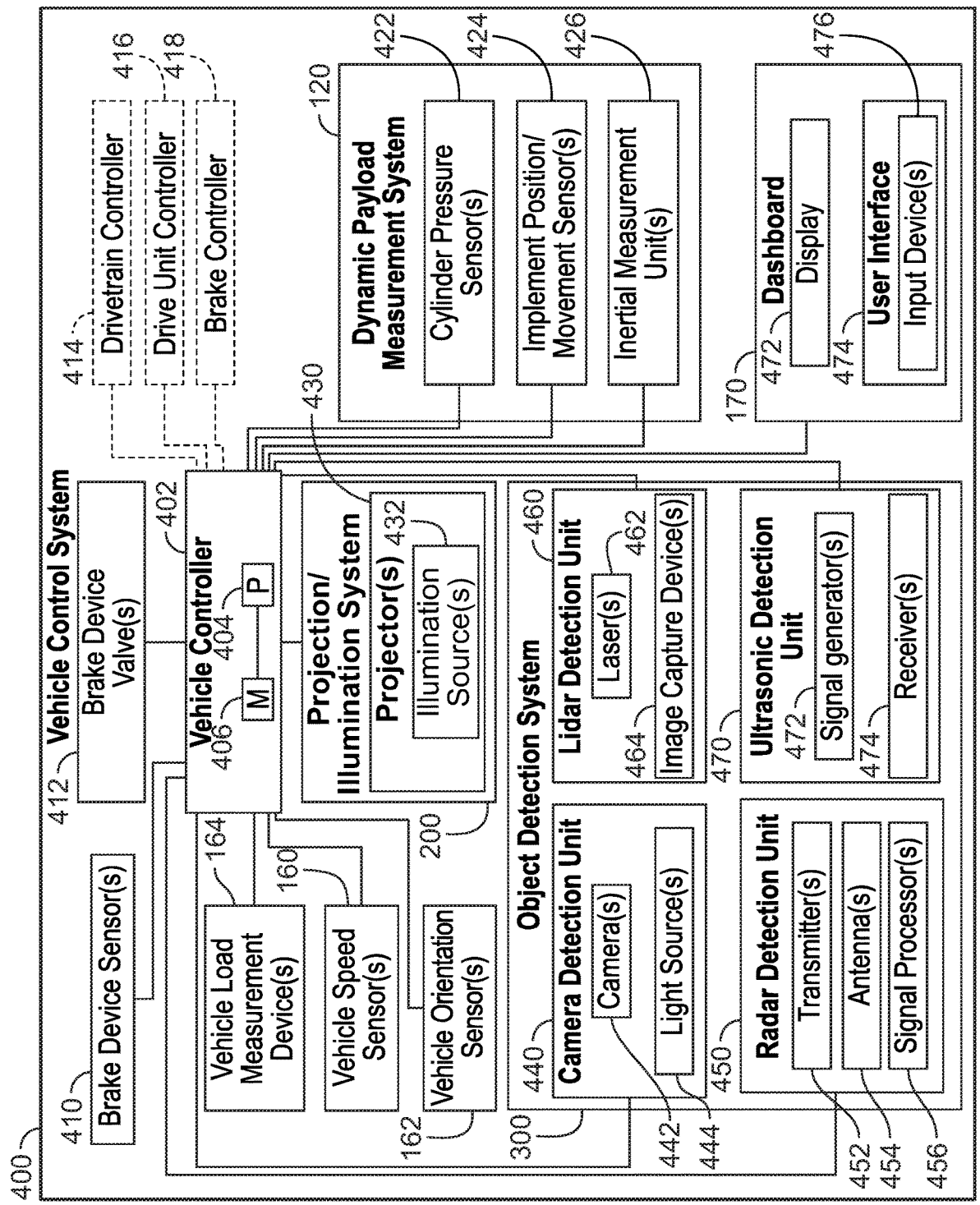
FIG. 4 is a diagrammatic view of a control system included in the loader of FIG. 1.

Referring now to FIG. 4, the illustrative control system 400 includes the dynamic payload measurement system 120, the one or more vehicle speed sensor(s) 160, the one or more vehicle orientation sensor(s) 162, the one or more vehicle load measurement device(s) 164, the dashboard 170, the projection/illumination system 200, the object detection system 300, the controller 402, one or more brake device sensor(s) 410, and one or more brake device valve(s) 412. Each of the components 120, 160, 162, 164, 170, 200, 300, 410, 412 is communicatively coupled to the controller 402, such as by a direct (e.g., hardwired) connection or controller area network (CAN) interface, for example. Additionally, in some embodiments, the control system 400 may include a drivetrain controller 414, a drive unit controller 416, and a brake controller 418, each of which may be communicatively coupled to the controller 402, such as by a direct (e.g., hardwired) connection or controller area network (CAN) interface, for example.

The illustrative payload measurement system 120 includes one or more cylinder pressure sensor(s) 422, one or more implement position/movement sensor(s) 424, and one or more inertial measurement unit(s) 426. The one or more cylinder pressure sensor(s) 422 are each configured to provide pressure input indicative of hydraulic pressure in one side of a corresponding hydraulic cylinder (not shown) of the articulation mechanism 112. In some embodiments, the one or more sensor(s) 422 may be substantially similar to the pressure sensors 36, 38, 40, 42 disclosed by the incorporated reference. The one or more implement position/movement sensor(s) 424 are each configured to provide position or movement input indicative of a position (e.g., angular position or displacement) or movement (e.g., angular velocity or acceleration) of one or more component(s) of the articulation mechanism 112 or the work implement 106. In some embodiments, the one or more sensor(s) 424 may be substantially similar to the acceleration sensors 30, 32, 34 disclosed by the incorporated reference. The one or more inertial measurement unit(s) 426 are each configured to measure linear acceleration of one or more component(s) of the articulation mechanism 112 or the work implement 106 to determine various operational characteristics thereof, such as specific force, angular velocity, and angular orientation, for example. In some embodiments, the one or more unit(s) 426 may include the one or more sensor(s) 424. In other embodiments, the one or more unit(s) 426 may cooperate with the one or more sensor(s) 424 to measure positional characteristic and/or movement of one or more component(s) of the articulation mechanism 112 or the work implement 106.

The one or more vehicle speed sensor(s) 160 are each illustratively configured to provide speed input indicative of a rotational speed of one or more components of the drivetrain 140. In some embodiments, at least one vehicle speed sensor 160 may be coupled to an output shaft of a transmission (not shown) included in the drivetrain 140. Additionally, in some embodiments, at least one vehicle speed sensor 160 may be coupled to an input shaft of a transmission of the drivetrain 140. Further, in some embodiments, at least one vehicle speed sensor 160 may be coupled to a component of an axle and/or differential included in the drivetrain 140. In any case, based on the speed input provided by the one or more speed sensor(s) 160, the controller 402 may determine a speed of the vehicle 100 as indicated above.

The one or more vehicle orientation sensor(s) 162 are each illustratively configured to measure operational characteristics of the vehicle 100 such as roll, pitch, and/or yaw, for example, which may be defined relative to one or more reference frames, axes, or coordinate systems. In some embodiments, the one or more vehicle orientation sensor(s) 162 may each be embodied as, or otherwise include, an accelerometer configured to measure movement of the vehicle 100 based on an inertial reference frame, or the like, for example. Additionally, in some embodiments, the orientation input provided by each of the one or more vehicle orientation sensor(s) 162 may be indicative of a pitch of the vehicle 100 that is defined by positional characteristics (e.g., angular position or displacement) and/or movement (e.g., angular velocity or acceleration) of multiple sections of the vehicle 100 relative to a pitch axis PA that extends into the page (see FIGS. 2 and 3). For example, in such embodiments, the orientation input may be indicative of an angular position of the front end 112 of the vehicle 100 relative to an angular position of the rear end 118 of the vehicle 100 about the pitch axis PA, and the relative angular positions of the front end 112 and the rear end 118 may define the pitch of the vehicle 100 about the pitch axis PA during braking events or the like. Of course, it should be appreciated that in other embodiments, the orientation input may be indicative of relative angular positions of other sections of the vehicle 100 (e.g., the main frame 102, the articulation mechanism 112, and the work implement 106) about the pitch axis PA that are defined during other vehicle operating states.

The one or more vehicle load measurement device(s) 164 are each illustratively configured to provide load input indicative of a base weight of the vehicle 100 independent of any payload carried by the work implement 106. Of course, it should be appreciated that in some embodiments, the load input may be indicative of a base weight of the vehicle 100 and a weight of one or more operator(s). The one or more vehicle load measurement device(s) 164 may each be embodied as, or otherwise include, a load cell coupled to the main frame 102, for example. Of course, it should be appreciated that in other embodiments, the one or more device(s) 164 may each be embodied as, or otherwise include, another suitable device coupled to another suitable location of the vehicle 100.

The dashboard 170 illustratively includes a display 472 and a user interface 474. The display 472 is configured to output or display various indications, messages, alerts, and/or prompts to an operator, which may be generated by the control system 400 (i.e., the controller 402). The user interface 474 is configured to provide various inputs to the control system 400 based on various actions, which may include actions performed by an operator. To that end, the user interface 474 includes one or more input devices 476.

The projection/illumination system 200 illustratively includes one or more projector(s) 430 having one or more illumination source(s) 432. Each projector 430 is configured to project light provided by one illumination source 432 onto the surface S proximate the vehicle 100 as indicated above when operated by the control system 400. In some embodiments, each illumination source 432 may be embodied as, or otherwise include, a light source such as a laser or the like. Additionally, in some embodiments, each illumination source 432 may be used in conjunction with an optical element, such as a lens, mirror, or the like.

The object detection system 300 is illustratively embodied as, or otherwise includes, any one or more of the following: a camera detection unit 440, a radar detection unit 450, a lidar detection unit 460, and an ultrasonic detection unit 470. Of course, in other embodiments, it should be appreciated that the object detection system 300 may include other suitable devices and/or systems.

The illustrative camera detection unit 440 is embodied as, or otherwise includes, any device or collection of devices capable of detecting and/or imaging objects that may be encountered by the vehicle 100 in use thereof. The illustrative unit 440 includes one or more camera(s) 442 and one or more light source(s) 444, and the unit 440 is communicatively coupled to the controller 402. Each camera 442 is configured to capture and/or store images of objects within a predetermined or reference proximity to the vehicle 100. In some embodiments, each camera 442 may be embodied as, or otherwise include, a digital camera, a panoramic camera, or the like, for example. Additionally, in some embodiments, each camera 442 may be included in, coupled to, or otherwise adapted for use with, a vision system. It should also be appreciated that each camera 442 has a viewable area associated therewith that may be illuminated with the aid of the one or more light source(s) 444. Each light source 444 may be embodied as, or otherwise include, any device capable of producing light to facilitate capture and/or identification of objects that may be encountered by the vehicle 100. It should be appreciated in some embodiments, the detection unit 440 may include other suitable components in addition to, or as an alternative to, the aforementioned devices.

The illustrative radar detection unit 450 is embodied as, or otherwise includes, any device or collection of devices capable of detecting and/or imaging, based on radio waves, objects that may be encountered by the vehicle 100 in use thereof. The illustrative unit 450 includes one or more transmitter(s) 452, one or more antenna(s) 454, and one or more signal processor(s) 456 communicatively coupled to the controller 402. Each transmitter 452 is embodied as, or otherwise includes, any device or collection of devices capable of emitting radio waves or radar signals in predetermined directions toward objects proximate the vehicle 100. Each antenna or receiver 454 is embodied as, or otherwise includes, any device or collection of devices capable of receiving radar signals emitted by the transmitter(s) 452 that are reflected and/or scattered by the objects. Each signal processor 456 is embodied as, or otherwise includes, any device or collection of devices (e.g., one or more processor(s)) capable of amplifying, processing, and/or conditioning radar signals received by the antenna(s) 454 to recover useful radar signals. It should be appreciated in some embodiments, the detection unit 450 may include other suitable components in addition to, or as an alternative to, the aforementioned devices.

The illustrative lidar detection unit 460 is embodied as, or otherwise includes, any device or collection of devices capable of detecting and/or imaging, using ultraviolet, visible, or near infrared light, objects that may be encountered by the vehicle 100 in use thereof. The illustrative detection unit 460 includes one or more laser(s) 462 and one or more image capture device(s) 464 communicatively coupled to the controller 402. Each laser 462 may be embodied as, or otherwise include, any device or collection of devices capable of emitting ultraviolet, visible, or near infrared light toward objects proximate the vehicle 100. Each image capture device 464 may be embodied as, or otherwise include, any device or collection of devices capable of illuminating a viewable area proximate the vehicle 100, sensing light reflected by the objects thereto, and processing the signals reflected by the objects to develop three-dimensional representations of the objects. In some embodiments, each image capture device 464 may be embodied as, or otherwise include, a flash lidar camera that has a light source, a sensor, and a controller. Furthermore, it should be appreciated that in some embodiments, the detection unit 460 may include other suitable components in addition to, or as an alternative to, the aforementioned devices, such as one or more phased array(s), microelectromechanical device(s), scanner(s), and photodetector(s), for example.

The illustrative ultrasonic detection unit 470 is embodied as, or otherwise includes, any device or collection of devices capable of detecting and/or imaging, based on ultrasonic sound waves, objects that may be encountered by the vehicle 100 in use thereof. The illustrative detection unit 470 includes one or more signal generator(s) 472 and one or more receiver(s) 474 communicatively coupled to the controller 402. Each signal generator 472 may be embodied as, or otherwise include, any device or collection of devices capable of generating and emitting ultrasonic sound waves toward objects proximate the vehicle 100. Each receiver 474 may be embodied as, or otherwise include, any device or collection of devices capable of receiving sound waves provided thereto from the objects and converting the sound waves into measurable electrical signals. It should be appreciated that in some embodiments, the detection unit 470 may include other suitable components in addition to, or as an alternative to, the aforementioned devices, such as one or more signal processor(s), for example.

The processor 404 of the illustrative controller 402 may be embodied as, or otherwise include, any type of processor, controller, or other compute circuit capable of performing various tasks such as compute functions and/or controlling the functions of the vehicle 100. For example, the processor 404 may be embodied as a single or multi-core processor(s), a microcontroller, or other processor or processing/controlling circuit. In some embodiments, the processor 404 may be embodied as, include, or otherwise be coupled to an FPGA, an application specific integrated circuit (ASIC), reconfigurable hardware or hardware circuitry, or other specialized hardware to facilitate performance of the functions described herein. Additionally, in some embodiments, the processor 404 may be embodied as, or otherwise include, a high-power processor, an accelerator co-processor, or a storage controller. In some embodiments still, the processor 404 may include more than one processor, controller, or compute circuit.

The memory device 406 of the illustrative controller 402 may be embodied as any type of volatile (e.g., dynamic random access memory (DRAM), etc.) or non-volatile memory capable of storing data therein. Volatile memory may be embodied as a storage medium that requires power to maintain the state of data stored by the medium. Non-limiting examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4 (these standards are available at wwwjedec.org). Such standards (and similar standards) may be referred to as DDR-based standards and communication interfaces of the storage devices that implement such standards may be referred to as DDR-based interfaces.

In some embodiments, the memory device 406 may be embodied as a block addressable memory, such as those based on NAND or NOR technologies. The memory device 406 may also include future generation nonvolatile devices, such as a three dimensional crosspoint memory device (e.g., Intel 3D XPoint™ memory), or other byte addressable write-in-place nonvolatile memory devices. In some embodiments, the memory device 406 may be embodied as, or may otherwise include, chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product. In some embodiments, 3D crosspoint memory (e.g., Intel 3D XPoint™ memory) may comprise a transistor-less stackable cross point architecture in which memory cells sit at the intersection of word lines and bit lines and are individually addressable and in which bit storage is based on a change in bulk resistance.

The one or more brake device sensor(s) 410 are each illustratively embodied as, or otherwise include, any device or collection of devices capable of providing braking input indicative of an activation status (e.g., an engaged/activated state or a disengaged/deactivated state) of one of the brake devices 150. In some embodiments, each brake device sensor 410 may provide input indicative of a state (e.g., a stroked state or de-stroked state) of a corresponding brake device valve 412. It should be appreciated that in some embodiments, braking input provided by each sensor 410 may be indicative of frictional resistance and/or pressure applied to one of the wheels 104 by one of the brake devices 150.

The one or more brake device valve(s) 412 are each illustratively embodied as, or otherwise include, any device or collection of devices capable of selectively providing hydraulic fluid pressure to one of the brake devices 150 in response to control input provided thereto by the controller 402 to effect activation/engagement and deactivation/disengagement of the one brake device 150. In some embodiments, each brake device valve 412 may be embodied as, or otherwise include, a solenoid valve, a proportional control valve, or the like. In any case, under control by the controller 402, the one or more brake device valve(s) 412 may be operated to adjust the brake capacity of, and/or perform brake metering of, the brake devices 150.

In some embodiments, the control system 400 may include the drivetrain controller 414 as indicated above. The drivetrain controller 414 may be embodied as, or otherwise include, one or more devices capable of controlling operation of the drivetrain 140 in use of the vehicle 100. The drivetrain controller 414 may include a memory device (not shown) and a processor (not shown) that is capable of executing instructions stored in the memory device to perform various functions attendant to the control of the drivetrain 140. In some embodiments, the drivetrain controller 414 may be provided separate from the controller 402. In other embodiments, the drivetrain controller 414 may be incorporated into, or otherwise form a portion of, the controller 402 such that provision of a separate drivetrain controller may be avoided.

In some embodiments, the control system 400 may include the drive unit controller 416 as indicated above. The drive unit controller 416 may be embodied as, or otherwise include, one or more devices capable of controlling operation of the drive unit 130 in use of the vehicle 100. The drive unit controller 416 may include a memory device (not shown) and a processor (not shown) that is capable of executing instructions stored in the memory device to perform various functions attendant to the control of the drive unit 130. In some embodiments, the drive unit controller 416 may be provided separate from the controller 402. In other embodiments, the drive unit controller 416 may be incorporated into, or otherwise form a portion of, the controller 402 such that provision of a separate drive unit controller may be avoided.

In some embodiments, the control system 400 may include the brake controller 418 as indicated above. The brake controller 418 may be embodied as, or otherwise include, one or more devices capable of controlling operation of the brake devices 150 in use of the vehicle 100. The brake controller 418 may include a memory device (not shown) and a processor (not shown) that is capable of executing instructions stored in the memory device to perform various functions attendant to the control of the brake devices 150. In some embodiments, the brake controller 418 may be provided separate from the controller 402. In other embodiments, the brake controller 418 may be incorporated into, or otherwise form a portion of, the controller 402 such that provision of a separate brake controller may be avoided.

Figure 5:
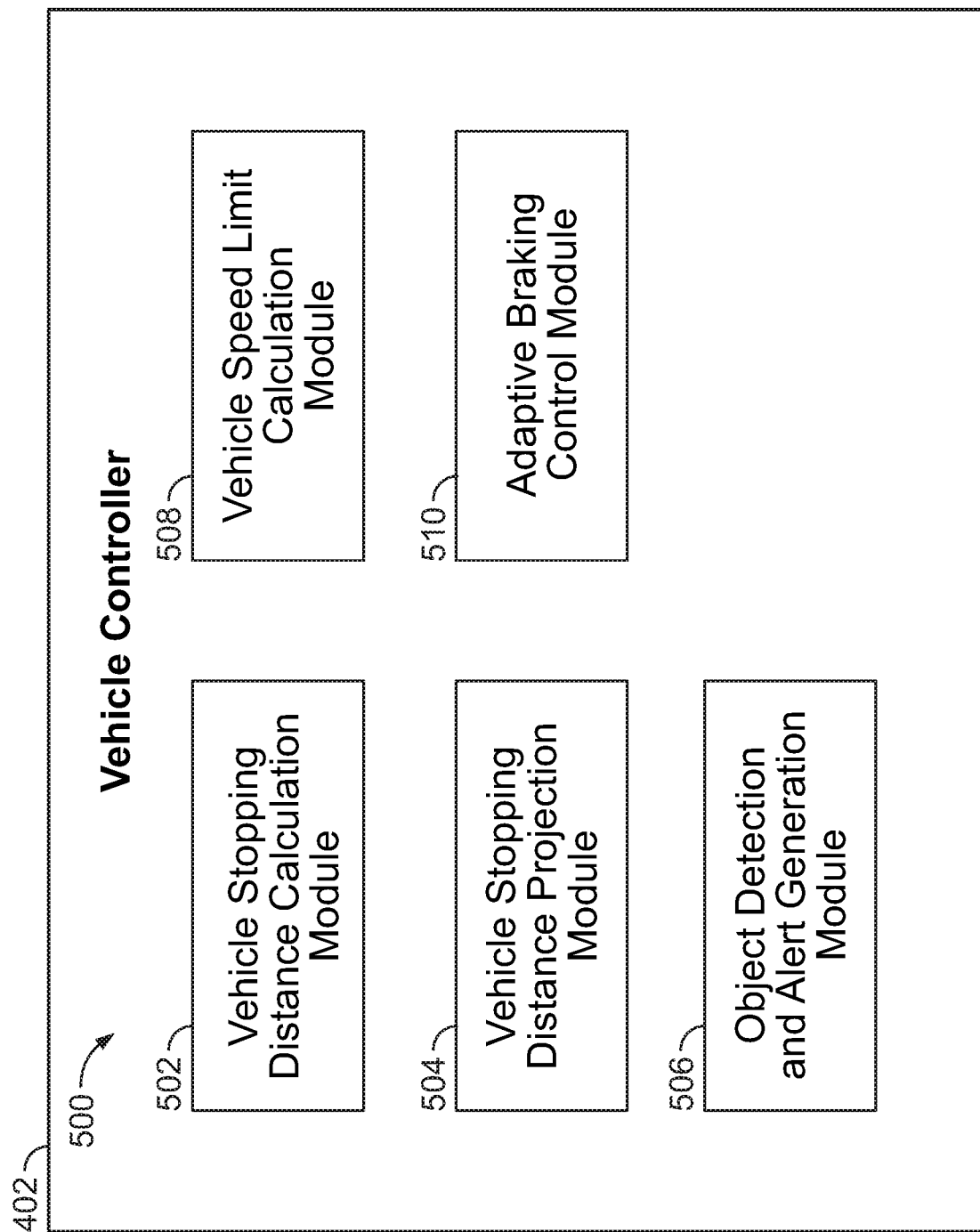
FIG. 5 is a diagrammatic view of a number of modules that may be included in a controller of the control system of FIG. 4.

Referring now to FIG. 5, in the illustrative embodiment, the controller 402 establishes an environment 500 during operation. The illustrative environment 500 includes a vehicle stopping distance calculation module 502, a vehicle stopping distance projection module 504, an object detection and alert generation module 506, a vehicle speed limit calculation module 508, and an adaptive braking control module 510.

Each of the modules, logic, and other components of the environment 500 may be embodied as hardware, firmware, software, or a combination thereof. As such, in some embodiments, one or more modules of the environment 500 may be embodied as circuitry or a collection of electrical devices. In such embodiments, one or more of the vehicle stopping distance calculation module 502, the vehicle stopping distance projection module 504, the object detection and alert generation module 506, the vehicle speed limit calculation module 508, and the adaptive braking control module 510 may form a portion of the processor(s) 404 and/or other components of the controller 402. Additionally, in some embodiments, one or more of the illustrative modules may form a portion of another module and/or one or more of the illustrative modules may be independent of one another. Further, in some embodiments, one or more of the modules of the environment 500 may be embodied as virtualized hardware components or emulated architecture, which may be established and maintained by the processor(s) 404 or other components of the controller 402.

The vehicle stopping distance calculation module 502, which may be embodied as hardware, firmware, software, virtualized hardware, emulated architecture, and/or a combination thereof as discussed above, is configured to calculate the vehicle stopping distance VSD of the vehicle 100 in use thereof. To do so, in the illustrative embodiment, the vehicle stopping distance calculation module 502 may perform the method described below with reference to FIG. 6.

The vehicle stopping distance projection module 504, which may be embodied as hardware, firmware, software, virtualized hardware, emulated architecture, and/or a combination thereof as discussed above, is configured to project (i.e., direct projection of) light onto the surface S using the projection system 200 over the projection distance PD corresponding to the vehicle stopping distance VSD in use of the vehicle 100. To do so, in the illustrative embodiment, the vehicle stopping distance projection module 504 may perform the method described below with reference to FIG. 7.

The object detection and alert generation module 506, which may be embodied as hardware, firmware, software, virtualized hardware, emulated architecture, and/or a combination thereof as discussed above, is configured to determine a proximity of the vehicle 100 to an object using the object detection system 300 and selectively generate an operator alert based on a determination of whether the determined proximity of the object is within the calculated vehicle stopping distance VSD of the vehicle 100. To do so, in the illustrative embodiment, the object detection and alert generation module 506 may perform the method described below with reference to FIG. 8.

The vehicle speed limit calculation module 508, which may be embodied as hardware, firmware, software, virtualized hardware, emulated architecture, and/or a combination thereof as discussed above, is configured to calculate and apply a vehicle speed limit to the vehicle 100 to effectively ensure that the vehicle 100 stops within a predetermined or reference distance. To do so, in the illustrative embodiment, the vehicle speed limit calculation module 508 may perform the method described below with reference to FIGS. 9 and 10.

The adaptive braking control module 510, which may be embodied as hardware, firmware, software, virtualized hardware, emulated architecture, and/or a combination thereof as discussed above, is configured to control the brake capacity and/or brake metering of the brake devices 150 in use of the vehicle 100. To do so, in the illustrative embodiment, the adaptive braking control module 510 may perform the method described below with reference to FIGS. 11 and 12.

Figure 6:
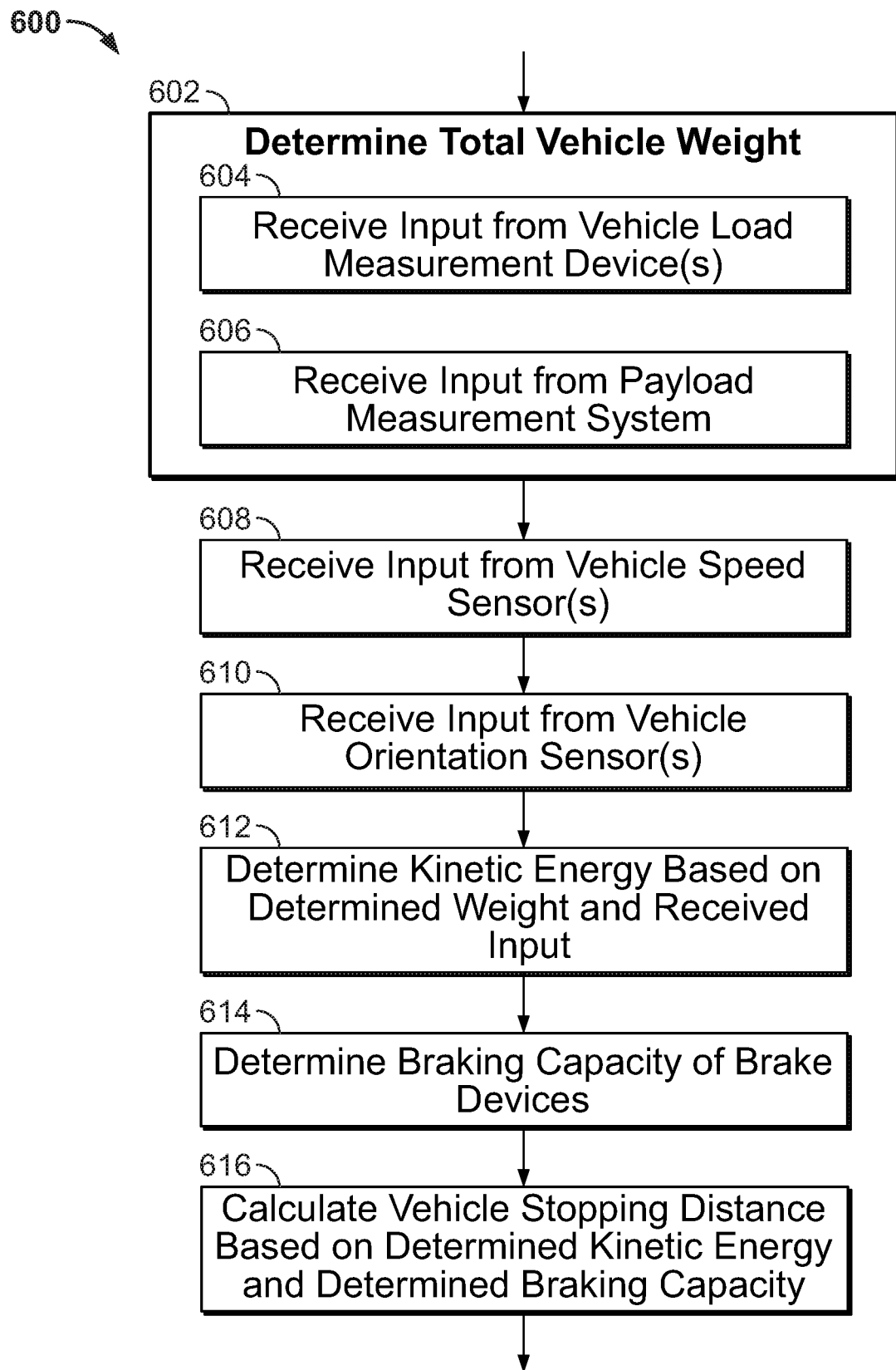
FIG. 6 is a simplified flowchart of a method that may be performed by a first one of the modules depicted in FIG. 5.

Referring now to FIG. 6, an illustrative method 600 of operating the vehicle 100 may be embodied as, or otherwise include, a set of instructions that are executable by the control system 400 (i.e., the vehicle stopping distance calculation module 502). The method 600 corresponds to, or is otherwise associated with, performance of the blocks described below in the illustrative sequence of FIG. 6. It should be appreciated, however, that the method 600 may be performed in one or more sequences different from the illustrative sequence.

The illustrative method 600 begins with block 602. In block 602, the controller 402 determines the total weight of the vehicle 100. To perform block 602, in the illustrative embodiment, the controller 402 performs blocks 604 and 606. In block 604, the controller 402 receives load input from the one or more vehicle load measurement device(s) 164 that may be indicative of the base weight of the vehicle 100 and the weight of one or more operator(s). Of course, it should be appreciated that in embodiments in which the base weight of the vehicle 100 is a parameter stored in the instructions of the memory device 406, block 604 may be omitted from the method 600. In block 606, the controller 402 receives payload input from the payload measurement system 120. Following performance of blocks 604 and 606, the method 600 subsequently proceeds to block 608.

In block 608 of the illustrative method 600, the controller 402 receives speed input from the one or more vehicle speed sensor(s) 160. From block 608, the method 600 subsequently proceeds to block 610.

In block 610 of the illustrative method 600, the controller 402 receives orientation input from the one or more vehicle orientation sensor(s) 162. In the illustrative embodiment, the orientation input is indicative of the pitch of the vehicle 100 about the pitch axis PA. From block 610, the method 600 subsequently proceeds to block 612.

In block 612 of the illustrative method 600, the controller 402 determines a kinetic energy of the vehicle 100 based on the total weight determined in block 602, the speed input received in block 608, and the orientation input received in block 610. From block 612, the method 600 subsequently proceeds to block 614.

In block 614 of the illustrative method 600, the controller 402 determines a braking capacity of the brake devices 150 of the vehicle 100. In some embodiments, to perform block 614, the controller 402 may receive braking input provided by the one or more brake device sensor(s) 410. From block 614, the method 600 subsequently proceeds to block 616.

In block 616 of the illustrative method 600, the controller 402 calculates the vehicle stopping distance VSD based on the kinetic energy determined in block 612 and the braking capacity determined in block 614. In some embodiments, performance of block 616 may be associated with, or otherwise correspond to, execution of one iteration of the method 600 in use of the vehicle 100.

Figure 7:
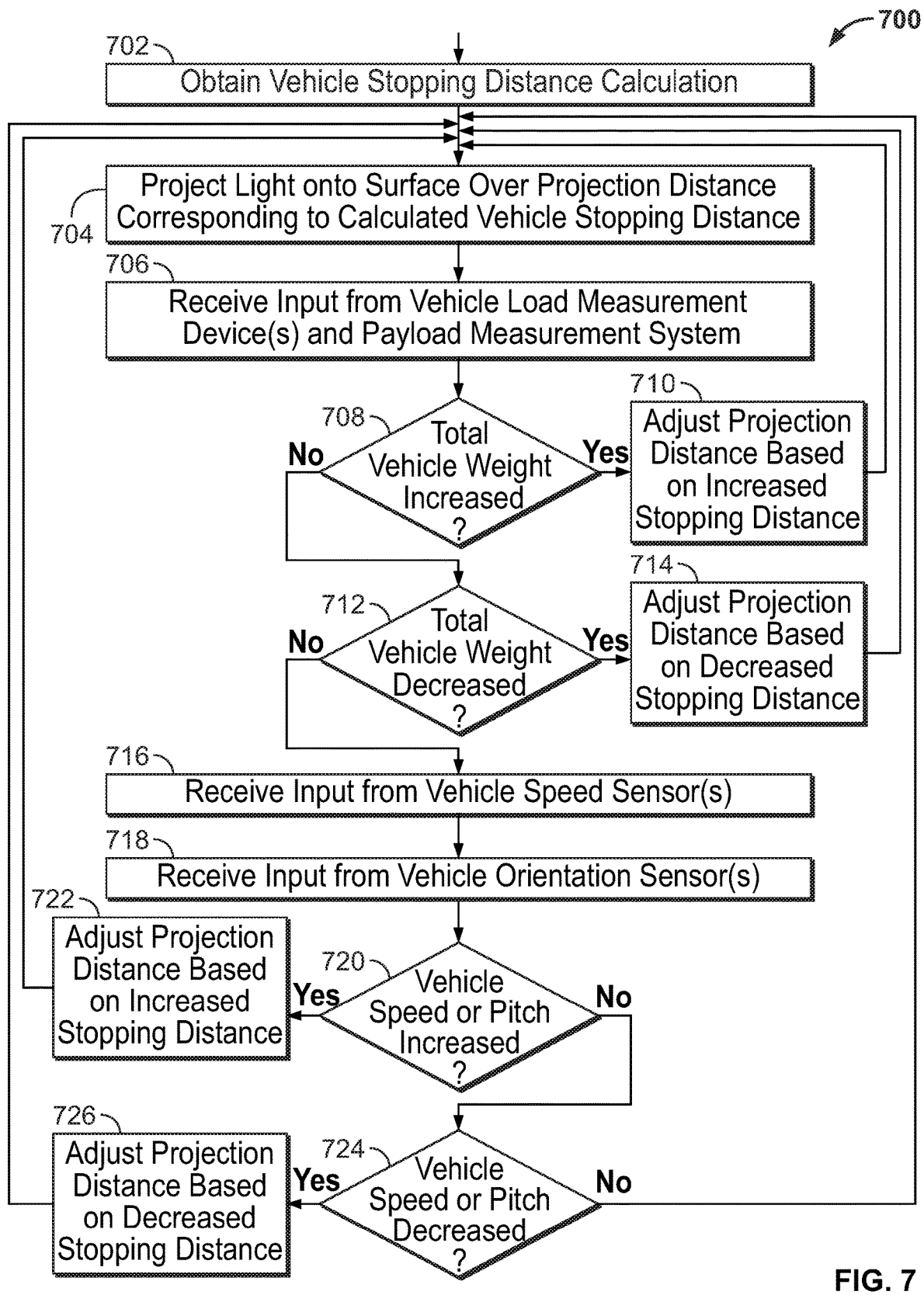
FIG. 7 is a simplified flowchart of a method that may be performed by a second one of the modules depicted in FIG. 5.

Referring now to FIG. 7, an illustrative method 700 of operating the vehicle 100 may be embodied as, or otherwise include, a set of instructions that are executable by the control system 400 (i.e., the vehicle stopping distance projection module 504). The method 700 corresponds to, or is otherwise associated with, performance of the blocks described below in the illustrative sequence of FIG. 7. It should be appreciated, however, that the method 700 may be performed in one or more sequences different from the illustrative sequence.

The illustrative method 700 begins with block 702. In block 702, the controller 402 obtains the calculated vehicle stopping distance VSD. In some embodiments, to perform block 702, the controller 402 may retrieve the calculated vehicle stopping distance VSD from the memory device 406 subsequent to performance of the method 600 described above. In any case, following performance of block 702, the method 700 subsequently proceeds to block 704.

In block 704 of the illustrative method 700, using the projection/illumination system 200, the controller 402 projects light onto the surface S over the projection distance PD that corresponds to the calculated vehicle stopping distance VSD obtained in block 702. As a result, a visual indication of the calculated vehicle stopping distance VSD is projected onto the surface S following performance of block 704 to alert the operator to the vehicle stopping distance VSD. From block 704, the method 700 subsequently proceeds to block 706.

In block 706 of the illustrative method 700, the controller 402 receives load input provided by the one or more vehicle load measurement device(s) 164 and payload input provided by the payload measurement system 120. It should be appreciated that the controller 402 may determine the total weight of the vehicle 100 based on the load input and the payload input provided in block 706 in similar fashion to the determination of the total weight discussed above with reference to block 602 of the method 600. Of course, in embodiments in which the base weight of the vehicle 100 is stored as a parameter in the memory device 406 such that the one or more device(s) 164 may be omitted, the controller 402 may receive only payload input provided by the payload measurement system 120 in block 706. In any case, from block 706, the method 700 subsequently proceeds to block 708.

In block 708 of the illustrative method 700, the controller 402 determines whether the total weight of the vehicle 100 has increased following the initial or previous calculation (e.g., by the method 600) of the vehicle stopping distance VSD. In some embodiments, to perform block 708, the controller 402 may compare the total weight of the vehicle 100 associated with the load input and the payload input received in block 706 to the total weight of the vehicle 100 determined in block 602 of the method 600. In any case, the determination made by the controller 402 in block 708 is based at least partially on the payload input received in block 706. If the controller 402 determines in block 708 that the total weight of the vehicle 100 has increased, the method 700 subsequently proceeds to block 710.

In block 710 of the illustrative method 700, using the projection/illumination system 200, the controller 402 adjusts the projection distance PD over which light is projected onto the surface S based on the determination made in block 708. It should be appreciated that the determination in block 708 that the total weight of the vehicle 100 has increased is associated with, corresponds to, or is otherwise accompanied by, determination of an increased vehicle stopping distance VSD. Thus, in block 710, the controller 402 adjusts the projection distance PD over which light is projected onto the surface S based on the increased vehicle stopping distance VSD associated with the determination made in block 708. From block 710, the method 700 subsequently returns to block 704.

Returning to block 708 of the illustrative method 700, if the controller 402 determines in block 708 that the total weight of the vehicle 100 has not increased, the illustrative method 700 proceeds to block 712. In block 712, the controller 402 determines whether the total weight of the vehicle 100 has decreased following the initial or previous calculation (e.g., by the method 600) of the vehicle stopping distance VSD. In some embodiments, to perform block 712, the controller 402 may compare the total weight of the vehicle 100 associated with the load input and the payload input received in block 706 to the total weight of the vehicle 100 determined in block 602 of the method 600. In any case, the determination made by the controller 402 in block 712 is based at least partially on the payload input received in block 706. If the controller 402 determines in block 712 that the total weight of the vehicle 100 has decreased, the method 700 subsequently proceeds to block 714.

In block 714 of the illustrative method 700, using the projection/illumination system 200, the controller 402 adjusts the projection distance PD over which light is projected onto the surface S based on the determination made in block 712. It should be appreciated that the determination in block 712 that the total weight of the vehicle 100 has decreased is associated with, corresponds to, or is otherwise accompanied by, determination of a decreased vehicle stopping distance VSD. Thus, in block 714, the controller 402 adjusts the projection distance PD over which light is projected onto the surface S based on the decreased vehicle stopping distance VSD associated with the determination made in block 712. From block 714, the method 700 subsequently returns to block 704.

Returning to block 712 of the illustrative method 700, if the controller 402 determines in block 712 that the total weight of the vehicle 100 has not decreased, the illustrative method 700 subsequently proceeds to block 716. In block 716, the controller 402 receives speed input from the one or more vehicle speed sensor(s) 160. From block 716, the method 700 subsequently proceeds to block 718.

In block 718 of the illustrative method 700, the controller 402 receives orientation input from the one or more vehicle orientation sensor(s) 162. In the illustrative embodiment, the orientation input is indicative of the pitch of the vehicle 100 about the pitch axis PA. From block 718, the method 700 subsequently proceeds to block 720.

In block 720 of the illustrative method 700, the controller 402 determines whether the pitch or the speed of the vehicle 100 has increased following the initial or previous calculation (e.g., by the method 600) of the vehicle stopping distance VSD. In some embodiments, to perform block 720, the controller 402 may compare the pitch of the vehicle 100 associated with the orientation input received in block 718 and the speed of the vehicle 100 associated with the speed input received in block 716 to the orientation input and the speed input received in corresponding blocks 610, 608 of the method 600. If the controller 402 determines in block 720 that the pitch of the vehicle 100 or the speed of the vehicle 100 has increased, the method 700 subsequently proceeds to block 722.

In block 722 of the illustrative method 700, using the projection/illumination system 200, the controller 402 adjusts the projection distance PD over which light is projected onto the surface S based on the determination made in block 720. It should be appreciated that the determination in block 720 that the pitch of the vehicle 100 or the speed of the vehicle 100 has increased is associated with, corresponds to, or is otherwise accompanied by, determination of an increased vehicle stopping distance VSD. Thus, in block 722, the controller 402 adjusts the projection distance PD over which light is projected onto the surface S based on the increased vehicle stopping distance VSD associated with the determination made in block 720. From block 722, the method 700 subsequently returns to block 704.

Returning to block 720 of the illustrative method 700, if the controller 402 determines in block 720 that the pitch of the vehicle 100 or the speed of the vehicle 100 has not increased, the illustrative method 700 proceeds to block 724. In block 724, the controller 402 determines whether the pitch or the speed of the vehicle 100 has decreased following the initial or previous calculation (e.g., by the method 600) of the vehicle stopping distance VSD. In some embodiments, to perform block 724, the controller 402 may compare the pitch of the vehicle 100 associated with the orientation input received in block 718 and the speed of the vehicle 100 associated with the speed input received in block 716 to the orientation input and the speed input received in corresponding blocks 610, 608 of the method 600. If the controller 402 determines in block 724 that the pitch of the vehicle 100 or the speed of the vehicle 100 has decreased, the method 700 subsequently proceeds to block 726.

In block 726 of the illustrative method 700, using the projection/illumination system 200, the controller 402 adjusts the projection distance PD over which light is projected onto the surface S based on the determination made in block 724. It should be appreciated that the determination in block 724 that the pitch of the vehicle 100 or the speed of the vehicle 100 has decreased is associated with, corresponds to, or is otherwise accompanied by, determination of a decreased vehicle stopping distance VSD. Thus, in block 726, the controller 402 adjusts the projection distance PD over which light is projected onto the surface S based on the decreased vehicle stopping distance VSD associated with the determination made in block 726. From block 726, the method 700 subsequently returns to block 704.

Returning to block 724 of the illustrative method 700, if the controller 402 determines in block 724 that the pitch of the vehicle 100 or the speed of the vehicle 100 has not decreased, the method 700 subsequently returns to block 704. In some embodiments, performance of block 724 may be associated with, or otherwise correspond to, execution of one iteration of the method 700 in use of the vehicle 100.

Figure 8:
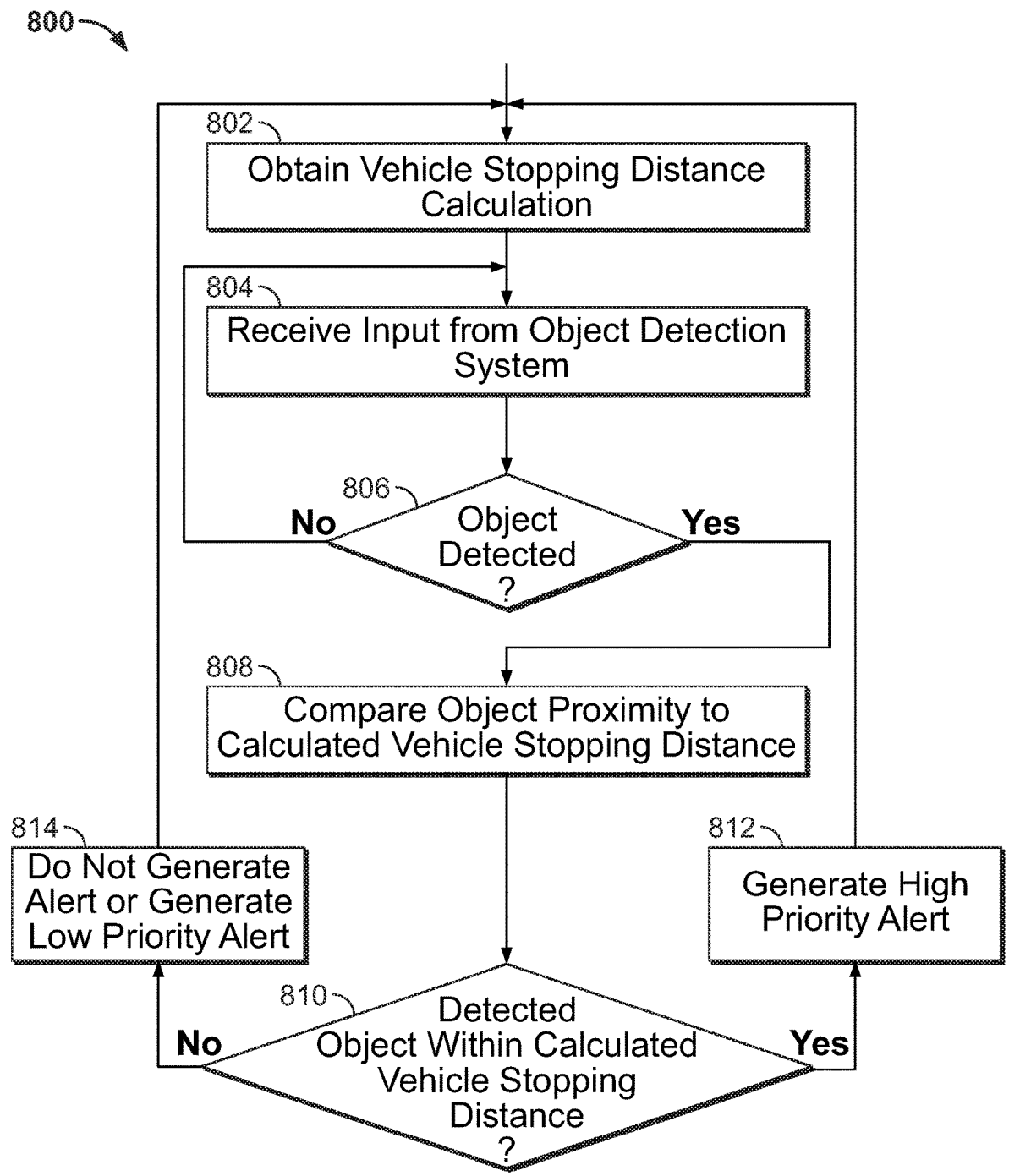
FIG. 8 is a simplified flowchart of a method that may be performed by a third one of the modules depicted in FIG. 5.

Referring now to FIG. 8, an illustrative method 800 of operating the vehicle 100 may be embodied as, or otherwise include, a set of instructions that are executable by the control system 400 (i.e., the object detection and alert generation module 506). The method 800 corresponds to, or is otherwise associated with, performance of the blocks described below in the illustrative sequence of FIG. 8. It should be appreciated, however, that the method 800 may be performed in one or more sequences different from the illustrative sequence.

The illustrative method 800 begins with block 802. In block 802, the controller 402 obtains the calculated vehicle stopping distance VSD. In some embodiments, to perform block 802, the controller 402 may retrieve the calculated vehicle stopping distance VSD from the memory device 406 subsequent to performance of the method 600 described above. In any case, following performance of block 802, the method 800 subsequently proceeds to block 804.

In block 804 of the illustrative method 800, the controller 402 receives detection input provided by the object detection system 300. From block 804, the method 800 subsequently proceeds to block 806.

In block 806 of the illustrative method 800, based on the detection input received in block 804, the controller 402 determines whether an object is detected within the object detection area DA. It should be appreciated that a determination made by the controller 402 in block 806 that an object is detected within the object detection area DA may be associated with, correspond to, or otherwise be accompanied by, a determination of the proximity of the detected object to the vehicle 100. If the controller 402 determines in block 806 that an object is detected within the object detection area DA, the method 800 subsequently proceeds to block 808.

In block 808 of the illustrative method 800, the controller 402 compares the proximity of the detected object to the vehicle 100 determined in block 806 to the calculated vehicle stopping distance VSD. From block 808, the method 800 subsequently proceeds to block 810.

In block 810 of the illustrative method 800, based on the comparison made in block 808, the controller 402 determines whether the proximity of the detected object to the vehicle 100 is within the calculated vehicle stopping distance VSD. If the controller 402 determines in block 810 that the proximity of the detected object to the vehicle 100 is within the calculated vehicle stopping distance VSD, the method 800 subsequently proceeds to block 812.

In block 812 of the illustrative method 800, the controller 402 generates a high priority alert that may be displayed on the display 472 of the dashboard 170. The high priority alert may inform an operator that the detected object is within the calculated vehicle stopping distance VSD to prompt an appropriate response. In any case, from block 812, the method 800 subsequently returns to block 802.

Returning to block 810 of the illustrative method 800, if the controller 402 determines in block 810 that the detected object is not within the calculated vehicle stopping distance VSD, the illustrative method 800 proceeds to block 814. In block 814, the controller 402 does not generate an operator alert or generates a low priority operator alert. The low priority alert may inform an operator that the detected object is not within the calculated vehicle stopping distance VSD. In any case, from block 814, the method 800 subsequently returns to block 802.

Returning to block 806 of the illustrative method 800, if the controller 402 determines in block 806 that, based on the detection input (or lack thereof) received in block 804, an object is not detected, the method 800 subsequently returns to block 804.

Figure 9:
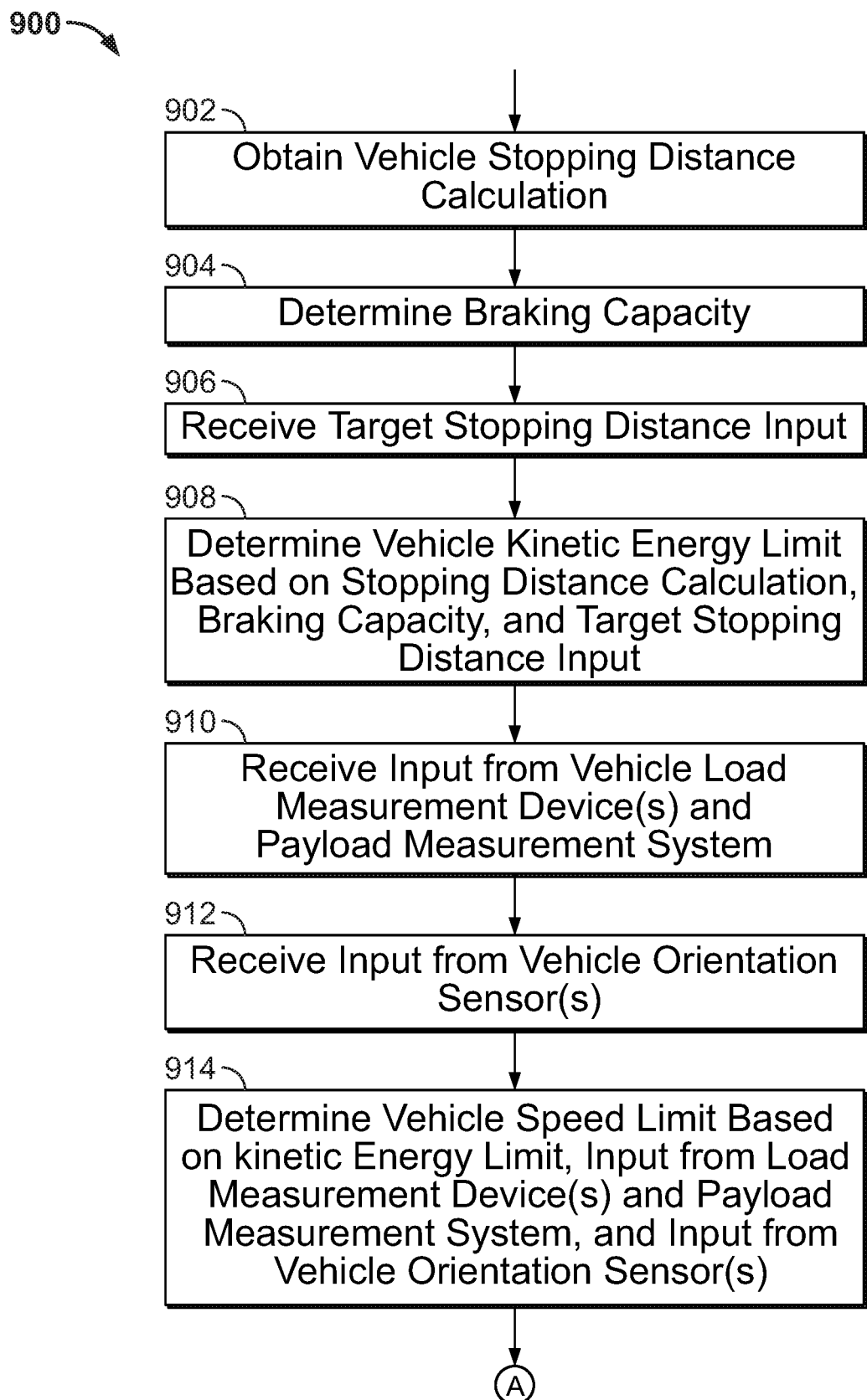
FIG. 9 is a simplified flowchart of a method that may be performed by a fourth one of the modules depicted in FIG. 5.
Figure 10:
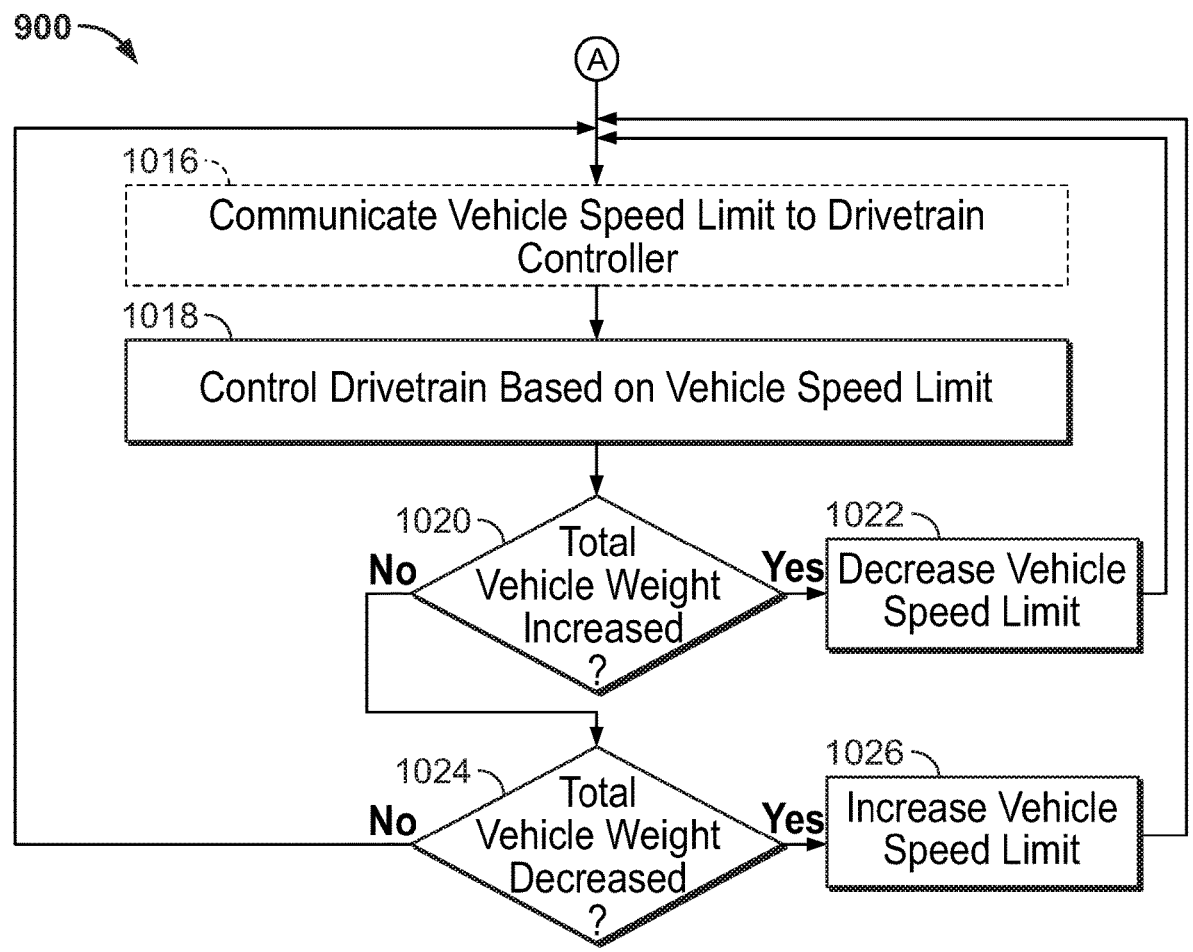
FIG. 10 is a simplified flowchart of additional blocks that may be included in the method depicted in FIG. 9.

Referring now to FIGS. 9 and 10, an illustrative method 900 of operating the vehicle 100 may be embodied as, or otherwise include, a set of instructions that are executable by the control system 400 (i.e., the vehicle speed limit calculation module 508). The method 900 corresponds to, or is otherwise associated with, performance of the blocks described below in the illustrative sequence of FIGS. 9 and 10. It should be appreciated, however, that the method 900 may be performed in one or more sequences different from the illustrative sequence. For the sake of clarity, blocks with 900 series designations are described below with reference to FIG. 9, whereas blocks with 1000 series designations are described below with reference to FIG. 10.

The illustrative method 900 begins with block 902. In block 902, the controller 402 obtains the calculated vehicle stopping distance VSD. In some embodiments, to perform block 902, the controller 402 may retrieve the calculated vehicle stopping distance VSD from the memory device 406 subsequent to performance of the method 600 described above. In any case, following performance of block 902, the method 900 subsequently proceeds to block 904.

In block 904 of the illustrative method 900, the controller 402 determines a braking capacity of the brake devices 150 of the vehicle 100. In some embodiments, to perform block 904, the controller 402 may receive braking input provided by the one or more brake device sensor(s) 410. From block 904, the method 900 subsequently proceeds to block 906.

In block 906 of the illustrative method 900, the controller 402 receives a target stopping distance provided by an operator using the dashboard 170 (e.g., the input device(s) 476). In some embodiments, the target stopping distance may be substantially equal to the calculated vehicle stopping distance VSD. In other embodiments, the target stopping distance may be less than the calculated vehicle stopping distance VSD. In any case, from block 906, the method 900 subsequently proceeds to block 908.

In block 908 of the illustrative method 900, the controller 402 determines a vehicle kinetic energy limit based on the vehicle stopping distance VSD obtained in block 902, the braking capacity determined in block 904, and the target stopping distance received in block 906. From block 908, the method 900 subsequently proceeds to block 910.

In block 910 of the illustrative method 900, the controller 402 receives load input provided by the one or more vehicle load measurement device(s) 164 and payload input provided by the payload measurement system 120. Of course, in embodiments in which the base weight of the vehicle 100 is stored as a parameter in the memory device 406 such that the one or more device(s) 164 may be omitted, the controller 402 may receive only payload input provided by the payload measurement system 120 in block 910. In any case, from block 910, the method 900 subsequently proceeds to block 912.

In block 912 of the illustrative method 900, the controller 402 receives orientation input from the one or more vehicle orientation sensor(s) 162. In the illustrative embodiment, the orientation input is indicative of the pitch of the vehicle 100 about the pitch axis PA. From block 912, the method 900 subsequently proceeds to block 914.

In block 914 of the illustrative method 900, the controller 402 determines a vehicle speed limit based on the kinetic energy limit determined in block 908, the load input and the payload input received in block 910, and the orientation input provided in block 912. From block 914, at least in some embodiments, the method 900 subsequently proceeds to block 1016.

In some embodiments, in block 1016, the controller 402 may communicate the vehicle speed limit determined in block 914 to the drivetrain controller 414. In such embodiments, control of the drivetrain 140 may be performed by the drivetrain controller 414 independently of control provided by the controller 402. Of course, in embodiments in which control of the drivetrain 140 is performed by the controller 402 such that provision of the drivetrain controller 414 may be avoided, block 1016 may be omitted from the method 900. From block 1016, the method 900 subsequently proceeds to block 1018.

In block 1018 of the illustrative method 900, the controller 402 (or the drivetrain controller 414 in embodiments in which block 1016 is applicable) controls the drivetrain 140 based on the vehicle speed limit determined in block 914. In doing so, the controller 402 (or the drivetrain controller 414) may substantially prevent the speed of the vehicle 100 from exceeding the vehicle speed limit. In any case, from block 1018, the method 900 subsequently proceeds to block 1020.

In block 1020 of the illustrative method 900, the controller 402 determines whether the total weight of the vehicle 100 has increased following the initial or previous calculation (e.g., by the method 600) of the vehicle stopping distance VSD. In some embodiments, to perform block 1020, the controller 402 may compare the total weight of the vehicle 100 associated with the load input and the payload input received in block 910 to the total weight of the vehicle 100 determined in block 602 of the method 600. In any case, the determination made by the controller 402 in block 1020 is based at least partially on the payload input received in block 910. If the controller 402 determines in block 1020 that the total weight of the vehicle 100 has increased, the method 900 subsequently proceeds to block 1022.

In block 1022 of the illustrative method 900, the controller 402 decreases the vehicle speed limit from the value determined in block 914. It should be appreciated that the determination in block 1020 that the total weight of the vehicle 100 has increased is associated with, corresponds to, or is otherwise accompanied by, determination of an increased vehicle stopping distance VSD. Therefore, in response to the increased vehicle stopping distance VSD, the controller 402 reduces the vehicle speed limit in block 1022. From block 1022, the method 900 subsequently returns to block 1016 (i.e., in embodiments in which block 1016 is applicable).

Returning to block 1020, if the controller 402 determines in block 1020 that the total vehicle weight has not increased, the illustrative method 900 subsequently proceeds to block 1024. In block 1024, the controller 402 determines whether the total weight of the vehicle 100 has decreased following the initial or previous calculation (e.g., by the method 600) of the vehicle stopping distance VSD. In some embodiments, to perform block 1024, the controller 402 may compare the total weight of the vehicle 100 associated with the load input and the payload input received in block 914 to the total weight of the vehicle 100 determined in block 602 of the method 600. In any case, the determination made by the controller 402 in block 1024 is based at least partially on the payload input received in block 914. If the controller 402 determines in block 1024 that the total weight of the vehicle 100 has decreased, the method 900 subsequently proceeds to block 1026.

In block 1026 of the illustrative method 900, the controller 402 increases the vehicle speed limit from the value determined in block 914. It should be appreciated that the determination in block 1024 that the total weight of the vehicle 100 has decreased is associated with, corresponds to, or is otherwise accompanied by, determination of a decreased vehicle stopping distance VSD. Therefore, in response to the decreased vehicle stopping distance VSD, the controller 402 increases the vehicle speed limit in block 1026. From block 1026, the method 900 subsequently returns to block 1016 (i.e., in embodiments in which block 1016 is applicable).

Returning to block 1024 of the illustrative method 900, if the controller 402 determines in block 1024 that the total weight of the vehicle 100 has not decreased, the illustrative method 900 subsequently returns to block 1016 (i.e., in embodiments in which block 1016 is applicable).

Figure 11:
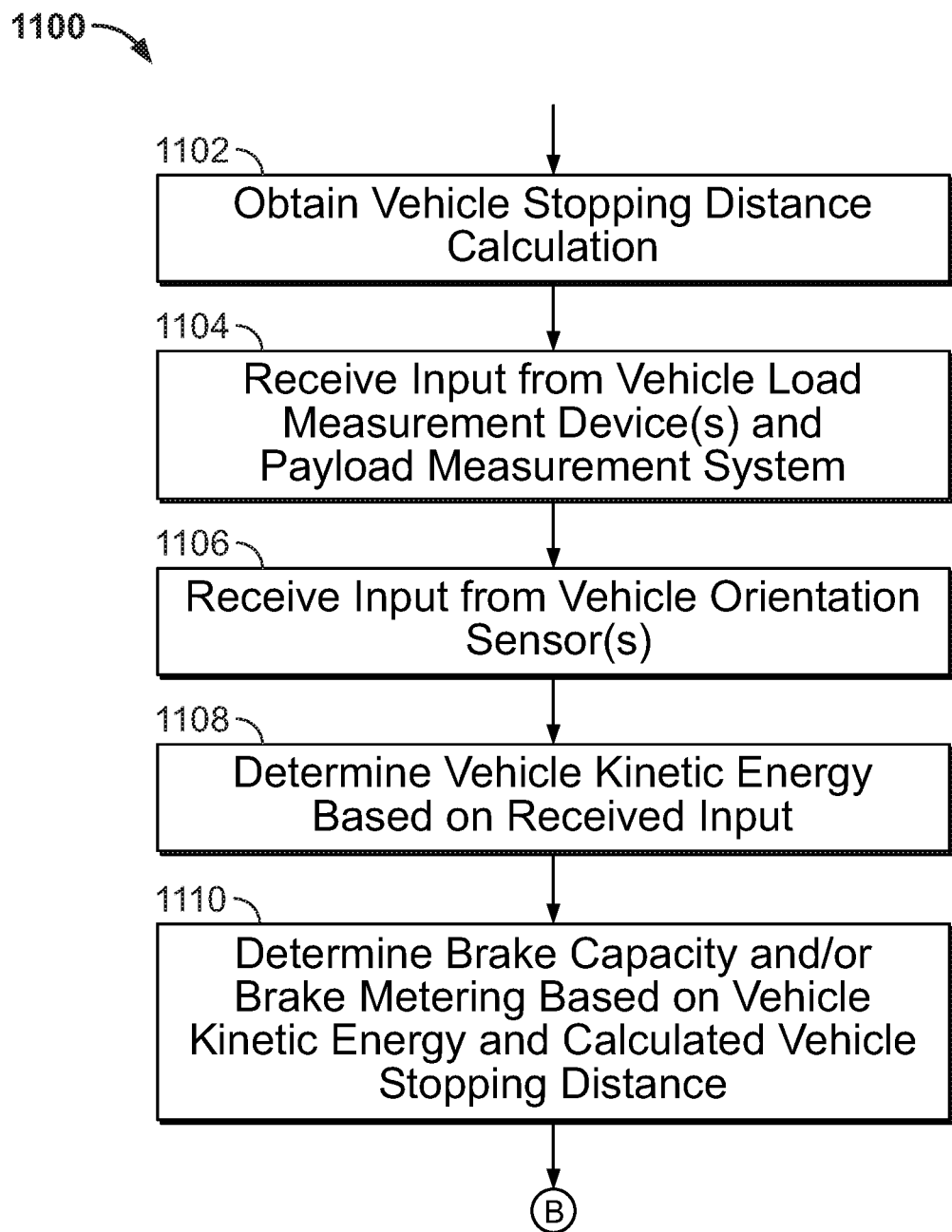
FIG. 11 is a simplified flowchart of a method that may be performed by a fifth one of the modules depicted in FIG. 5.
Figure 12:
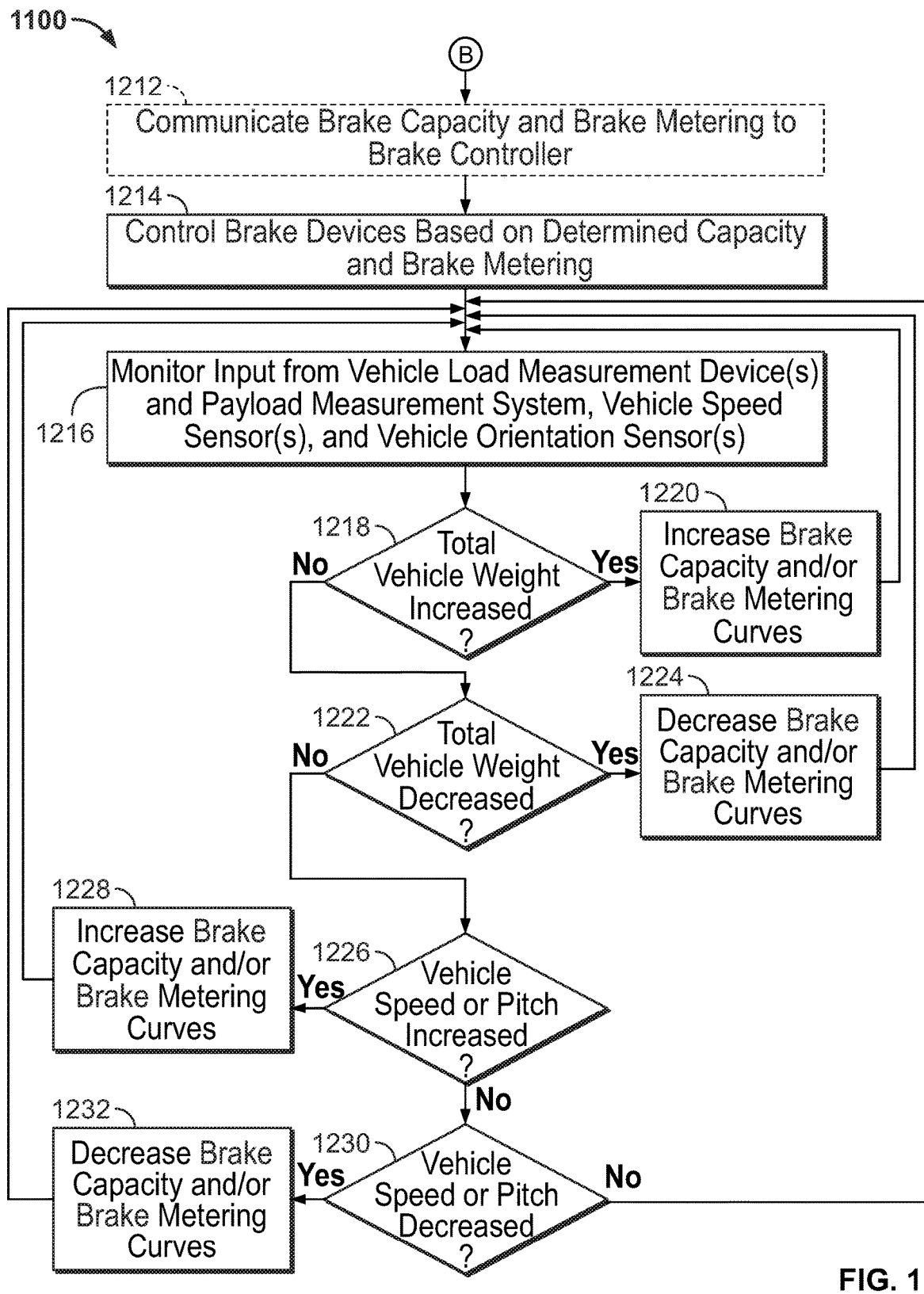
FIG. 12 is a simplified flowchart of additional blocks that may be included in the method depicted in FIG. 11.

Referring now to FIGS. 11 and 12, an illustrative method 1100 of operating the vehicle 100 may be embodied as, or otherwise include, a set of instructions that are executable by the control system 400 (i.e., the adaptive braking control module 510). The method 1100 corresponds to, or is otherwise associated with, performance of the blocks described below in the illustrative sequence of FIGS. 11 and 12. It should be appreciated, however, that the method 1100 may be performed in one or more sequences different from the illustrative sequence. For the sake of clarity, blocks with 1100 series designations are described below with reference to FIG. 11, whereas blocks with 1200 series designations are described below with reference to FIG. 12.

The illustrative method 1100 begins with block 1102. In block 1102, the controller 402 obtains the calculated vehicle stopping distance VSD. In some embodiments, to perform block 1102, the controller 402 may retrieve the calculated vehicle stopping distance VSD from the memory device 406 subsequent to performance of the method 600 described above. In any case, following performance of block 1102, the method 1100 subsequently proceeds to block 1104.

In block 1104 of the illustrative method 1100, the controller 402 receives load input provided by the one or more vehicle load measurement device(s) 164 and payload input provided by the payload measurement system 120. Of course, in embodiments in which the base weight of the vehicle 100 is stored as a parameter in the memory device 406 such that the one or more device(s) 164 may be omitted, the controller 402 may receive only payload input provided by the payload measurement system 120 in block 1104. In any case, from block 1104, the method 1100 subsequently proceeds to block 1106.

In block 1106 of the illustrative method 1100, the controller 402 receives orientation input from the one or more vehicle orientation sensor(s) 162. In the illustrative embodiment, the orientation input is indicative of the pitch of the vehicle 100 about the axis PA. From block 1106, the method 1100 subsequently proceeds to block 1108.

In block 1108 of the illustrative method 1000, the controller 402 determines the kinetic energy of the vehicle 100 based on the load input and the payload input received in block 1104 and the orientation input received in block 1106. In some embodiments, the kinetic energy determination made by the controller 402 in block 1108 may be based on, or otherwise account for, the vehicle stopping distance VSD obtained in block 1102. In any case, from block 1108, the method 1100 subsequently proceeds to block 1110.

In block 1110 of the illustrative method 1100, the controller 402 determines a brake capacity and/or brake metering of one or more of the brake devices 150 based on the kinetic energy determined in block 1108 and the calculated vehicle stopping distance VSD obtained in block 1102. To do so, in some embodiments, the controller 402 may receive braking input provided by the brake device sensor(s) 410 and/or determine adjustments to the brake device valve(s) 412 to control fluid pressure application to the brake devices 150. In such embodiments, the brake device valve(s) 412 may be embodied as, or otherwise includes, one or more metering valve(s), proportional valve(s), or the like. In any case, from block 1110, at least in some embodiments, the method 1100 subsequently proceeds to block 1212.

In some embodiments, in block 1212, the controller 402 may communicate the brake capacity and/or brake metering determined in block 1110 to the brake controller 418. In such embodiments, control of the brake devices 150 may be performed by the brake controller 418 independently of control provided by the controller 402. Of course, in embodiments in which control of the brake devices 150 is performed by the controller 402 such that provision of the brake controller 418 may be avoided, block 1212 may be omitted from the method 1100. From block 1212, the method 1100 subsequently proceeds to block 1214.

In block 1214 of the illustrative method 1100, the controller 402 (or the brake controller 418 in embodiments in which block 1212 is applicable) controls the brake devices 150 based on the brake capacity and/or brake metering determined in block 1110. To do so, in some embodiments, the controller 402 (or the brake controller 418) may selectively adjust fluid pressure application to one or more brake devices 150 via the brake device valve(s) 412 based on a predetermined or reference schedule to facilitate balanced braking of the vehicle 100. In any case, from block 1214, the method 1100 subsequently proceeds to block 1216.

In block 1216 of the illustrative method 1100, the controller 402 monitors input provided by the vehicle load measurement device(s) 164, the payload measurement system 120, the vehicle speed sensor(s) 160, and the vehicle orientation sensor(s) 162. To perform block 1216, in some embodiments, the controller 402 may receive payload input from the system 120 and load input from the device(s) 164, speed input from the sensor(s) 160, and orientation input from the sensor(s) 162. Regardless, from block 1216, the method 1100 subsequently proceeds to block 1218.

In block 1218 of the illustrative method 1100, the controller 402 determines whether the total weight of the vehicle 100 has increased following the initial or previous calculation (e.g., by the method 600) of the vehicle stopping distance VSD. In some embodiments, to perform block 1218, the controller 402 may compare the total weight of the vehicle 100 associated with the load input and the payload input received in block 1216 to the total weight of the vehicle 100 determined in block 602 of the method 600. In any case, the determination made by the controller 402 in block 1218 is based at least partially on the payload input received in block 1216. If the controller 402 determines in block 1218 that the total weight of the vehicle 100 has increased, the method 1100 subsequently proceeds to block 1220.

In block 1220 of the illustrative method 1100, the controller 402 increases the brake capacity and/or brake metering curves of one or more brake devices 150 in response to the determination of increased total vehicle weight in block 1218. To perform block 1220, in some embodiments, the controller 402 may retrieve brake capacity and/or brake metering curves, plots, and/or reference tables stored in the memory device 406 and modify/increase those curves, plots, and/or reference tables in view of the increased total vehicle weight determined in block 1218. Additionally, in such embodiments, the controller 402 may store the increased/modified curves, plots, and/or reference tables in the memory device 406 to perform block 1220. In any case, from block 1220, the method 1100 subsequently returns to block 1216.

Returning to block 1218 of the illustrative method 1100, if the controller 402 determines in block 1218 that the total weight of the vehicle 100 has not increased, the method 1100 subsequently proceeds to block 1222. In block 1222, the controller 402 determines whether the total weight of the vehicle 100 has decreased following the initial or previous calculation (e.g., by the method 600) of the vehicle stopping distance VSD. In some embodiments, to perform block 1222, the controller 402 may compare the total weight of the vehicle 100 associated with the load input and the payload input received in block 1216 to the total weight of the vehicle 100 determined in block 602 of the method 600. In any case, the determination made by the controller 402 in block 1222 is based at least partially on the payload input received in block 1216. If the controller 402 determines in block 1222 that the total weight of the vehicle 100 has decreased, the method 1100 subsequently proceeds to block 1224.

In block 1224 of the illustrative method 1100, the controller 402 decreases the brake capacity and/or brake metering curves of one or more brake devices 150 in response to the determination of decreased total vehicle weight in block 1222. To perform block 1224, in some embodiments, the controller 402 may retrieve brake capacity and/or brake metering curves, plots, and/or reference tables stored in the memory device 406 and modify/decrease those curves, plots, and/or reference tables in view of the decreased total vehicle weight determined in block 1222. Additionally, in such embodiments, the controller 402 may store the decreased/modified curves, plots, and/or reference tables in the memory device 406 to perform block 1224. In any case, from block 1224, the method 1100 subsequently returns to block 1216.

Returning to block 1222 of the illustrative method 1100, if the controller 402 determines in block 1222 that the total weight of the vehicle 100 has not decreased, the method 1100 subsequently proceeds to block 1226. In block 1226, the controller 402 determines whether the pitch or the speed of the vehicle 100 has increased following the initial or previous calculation (e.g., by the method 600) of the vehicle stopping distance VSD. In some embodiments, to perform block 1226, the controller 402 may compare the pitch of the vehicle 100 associated with the orientation input received in block 1216 and the speed of the vehicle 100 associated with the speed input received in block 1216 to the orientation input and the speed input received in corresponding blocks 610, 608 of the method 600. If the controller 402 determines in block 1226 that the pitch of the vehicle 100 or the speed of the vehicle 100 has increased, the method 1100 subsequently proceeds to block 1228.

In block 1228 of the illustrative method 1100, similar to block 1220, the controller 402 increases the brake capacity and/or brake metering curves of one or more brake devices 150 in response to the determination of increased vehicle pitch or vehicle speed in block 1226. To perform block 1228, in some embodiments, the controller 402 may retrieve brake capacity and/or brake metering curves, plots, and/or reference tables stored in the memory device 406 and modify/increase those curves, plots, and/or reference tables in view of the increased vehicle pitch or vehicle speed determined in block 1226. Additionally, in such embodiments, the controller 402 may store the increased/modified curves, plots, and/or reference tables in the memory device 406 to perform block 1228. In any case, from block 1228, the method 1100 subsequently returns to block 1216.

Returning to block 1226 of the illustrative method 1100, if the controller 402 determines in block 1226 that the pitch or the speed of the vehicle 100 has not increased, the method 1100 subsequently proceeds to block 1230. In block 1230, the controller 402 determines whether the pitch or the speed of the vehicle 100 has decreased following the initial or previous calculation (e.g., by the method 600) of the vehicle stopping distance VSD. In some embodiments, to perform block 1230, the controller 402 may compare the pitch of the vehicle 100 associated with the orientation input received in block 1216 and the speed of the vehicle 100 associated with the speed input received in block 1216 to the orientation input and the speed input received in corresponding blocks 610, 608 of the method 600. If the controller 402 determines in block 1230 that the pitch of the vehicle 100 or the speed of the vehicle 100 has decreased, the method 1100 subsequently proceeds to block 1232.

In block 1232 of the illustrative method 1100, similar to block 1224, the controller 402 decreases the brake capacity and/or brake metering curves of one or more brake devices 150 in response to the determination of decreased vehicle pitch or vehicle speed in block 1230. To perform block 1232, in some embodiments, the controller 402 may retrieve brake capacity and/or brake metering curves, plots, and/or reference tables stored in the memory device 406 and modify/decrease those curves, plots, and/or reference tables in view of the decreased vehicle pitch or vehicle speed determined in block 1230. Additionally, in such embodiments, the controller 402 may store the decreased/modified curves, plots, and/or reference tables in the memory device 406 to perform block 1232. In any case, from block 1232, the method 1100 subsequently returns to block 1216.

Returning to block 1230 of the illustrative method 1100, if the controller 402 determines in block 1230 that the vehicle speed or the vehicle pitch has not decreased, the method 1100 subsequently returns to block 1216.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

The invention claimed is:

1. A vehicle comprising:
  a main frame;
  a work implement supported by the main frame and configured to carry a payload in use of the vehicle; and
  a control system supported by the main frame and configured to control operation of the vehicle, wherein the control system includes a payload measurement system configured to provide payload input indicative of a variable payload carried by the work implement in use of the vehicle and a controller coupled to the payload measurement system, wherein the controller includes a processor and a memory device coupled to the processor that has instructions stored therein, and wherein the instructions stored in the memory device are executable by the processor to cause the processor to receive the payload input provided by the payload measurement system, to determine a total weight of the vehicle based at least partially on the payload input and a base weight of the vehicle, to determine a kinetic energy of the vehicle based at least partially on the determined total weight, to determine a braking capacity of at least one brake device of the vehicle, and to calculate a stopping distance of the vehicle based on the determined kinetic energy of the vehicle and the determined brake capacity of the at least one brake device of the vehicle.

2. The vehicle of claim 1, wherein the instructions stored in the memory device are executable by the processor to cause the processor to receive speed input indicative of a speed of the vehicle from at least one vehicle speed sensor, to receive orientation input indicative of an orientation of the vehicle from at least one vehicle orientation sensor, and to determine the kinetic energy of the vehicle based on the determined total weight, the received speed input, and the received orientation input.

3. The vehicle of claim 2, wherein the orientation input is indicative of a pitch of the vehicle that is defined by positional characteristics of multiple sections of the vehicle relative to a pitch axis.

4. The vehicle of claim 1, wherein the control system includes a projection system coupled to the controller and configured to project light onto a surface proximate the vehicle in use thereof, and wherein the instructions stored in the memory device are executable by the processor to cause the processor to project light onto a surface proximate the vehicle using the projection system over a projection distance that corresponds to the calculated stopping distance.

5. The vehicle of claim 4, wherein the instructions stored in the memory device are executable by the processor to cause the processor to determine whether the total weight of the vehicle has increased based at least partially on the payload input and to selectively adjust the projection distance over which light is projected based on that determination.

6. The vehicle of claim 5, wherein the instructions stored in the memory device are executable by the processor to cause the processor to receive speed input indicative of a speed of the vehicle from at least one vehicle speed sensor, to receive orientation input indicative of an orientation of the vehicle from at least one vehicle orientation sensor, and to selectively adjust the projection distance over which light is projected based on the received speed input and the received orientation input.

7. The vehicle of claim 1, wherein the control system includes an object detection system coupled to the controller and configured to provide detection input indicative of a presence of an object proximate the vehicle in use thereof, and wherein the instructions stored in the memory device are executable by the processor to cause the processor to determine a proximity of the vehicle to an object based on the detection input and to compare the determined proximity to the calculated stopping distance of the vehicle.

8. The vehicle of claim 7, wherein the instructions stored in the memory device are executable by the processor to cause the processor to determine whether the proximity of the vehicle to the object is within the calculated stopping distance of the vehicle based on the comparison and to selectively generate an operator alert based on that determination.

9. The vehicle of claim 1, wherein the instructions stored in the memory device are executable by the processor to cause the processor to determine a vehicle kinetic energy limit based at least partially on the determined braking capacity and a target stopping distance provided to the controller by an operator and to determine a vehicle speed limit based at least partially on the determined vehicle kinetic energy limit, the payload input provided to the controller by the payload measurement system, and orientation input provided to the controller by at least one orientation sensor that is indicative of an orientation of the vehicle.

10. The vehicle of claim 9, wherein the instructions stored in the memory device are executable by the processor to cause the processor to determine whether the total weight of the vehicle has increased and to adjust the vehicle speed limit based on that determination.

11. The vehicle of claim 1, wherein the instructions stored in the memory device are executable by the processor to cause the processor to determine the kinetic energy of the vehicle based at least partially on the payload input provided to the controller by the payload measurement system and orientation input provided to the controller by at least one orientation sensor that is indicative of an orientation of the vehicle, and to cause the processor to determine a brake capacity and/or brake metering of at least one brake device of the vehicle based on the determined kinetic energy and the calculated stopping distance of the vehicle.

12. The vehicle of claim 11, wherein the instructions stored in the memory device are executable by the processor to cause the processor to determine whether the total weight of the vehicle has increased, to determine whether a speed of the vehicle has increased, to determine whether a pitch of the vehicle has increased, and to selectively adjust the brake capacity and/or brake metering of the at least one brake device based on those determinations.

13. A method of operating a vehicle including a main frame, a work implement coupled to the main frame and configured to carry a payload, and a control system coupled to the main frame and configured to control operation of the vehicle, the method comprising:
  receiving, by a controller of the control system and from a payload measurement system of the control system, payload input indicative of a variable payload carried by the work implement;
  determining, by the controller and based at least partially on the payload input and a base weight of the vehicle, a total weight of the vehicle;
  determining, by the controller and based at least partially on the determined total weight, a kinetic energy of the vehicle;
  determining, by the controller, a braking capacity of at least one brake device of the vehicle; and
  calculating, by the controller and based on the determined kinetic energy of the vehicle and the determined brake capacity of the at least one brake device of the vehicle, a stopping distance of the vehicle.

14. The method of claim 13, further comprising:
  receiving, by the controller and from at least one vehicle speed sensor of the control system, speed input indicative of a speed of the vehicle;
  receiving, by the controller and from at least one vehicle orientation sensor of the control system, orientation input indicative of a pitch of the vehicle that is defined by positional characteristics of multiple sections of the vehicle relative to a pitch axis; and
  determining, by the controller and based on the determined total weight, the received speed input, and the received orientation input, the kinetic energy of the vehicle.

15. The method of claim 13, wherein the control system includes a projection system configured to project light onto a surface proximate the vehicle, the method further comprising:
- projecting, by the controller and using the projection system, light onto a surface proximate the vehicle over a projection distance that corresponds to the calculated stopping distance;
- receiving, by the controller and from the payload measurement system, payload input provided subsequent to the stopping distance calculation;
- determining, by the controller and based at least partially on the payload input, whether the total weight of the vehicle has increased;
- adjusting, selectively by the controller and in response to the determination associated with total weight, the projection distance over which light is projected onto the surface;
- receiving, by the controller and from at least one vehicle speed sensor of the control system, speed input indicative of a speed of the vehicle that is provided subsequent to the stopping distance calculation;
- determining, by the controller and based on the speed input, whether the speed of the vehicle has increased; and
- adjusting, selectively by the controller and in response to the determination associated with speed, the projection distance over which light is projected onto the surface.

16. The method of claim 13, wherein the control system includes an object detection system configured to provide detection input indicative of a presence of an object proximate the vehicle, the method further comprising:
- determining, by the controller and based on the detection input, a proximity of the vehicle to an object;
- comparing, by the controller, the determined proximity to the calculated stopping distance of the vehicle;
- determining, by the controller in response to the comparison, whether the proximity of the vehicle to the object is within the calculated stopping distance; and
- generating, by the controller and in response to a determination that the proximity of the vehicle to the object is within the calculated stopping distance, a high priority operator alert.

17. The method of claim 13, further comprising:
- determining, by the controller and based on the calculated stopping distance, the determined braking capacity, and a target stopping distance provided to the controller by an operator, a vehicle kinetic energy limit;
- receiving, by the controller and from the payload measurement system, payload input provided subsequent to the stopping distance calculation;
- receiving, by the controller and from at least one vehicle orientation sensor of the vehicle, orientation input indicative of an orientation of the vehicle that is provided subsequent to the stopping distance calculation;
- determining, by the controller and based at least partially on the determined vehicle kinetic energy limit, the received payload input, and the received orientation input, a vehicle speed limit;
- determining, by the controller and based at least partially on the payload input, whether the total weight of the vehicle has increased; and
- decreasing, by the controller and in response to a determination that the total weight of the vehicle has increased, the vehicle speed limit.

18. The method of claim 13, further comprising:
- determining, by the controller and based at least partially on payload input provided to the controller subsequent to the stopping distance calculation and orientation input provided to the controller subsequent to the stopping distance calculation that is indicative of an orientation of the vehicle, the kinetic energy of the vehicle;
- determining, by the controller and based on the determined kinetic energy and the calculated stopping distance of the vehicle, a brake capacity and/or brake metering of at least one brake device of the vehicle;
- determining, by the controller and based at least partially on the payload input, whether the total weight of the vehicle has increased;
- determining, by the controller and based at least partially on the orientation input, whether a pitch of the vehicle has increased; and
- adjusting, selectively by the controller and in response to the determinations associated with the total weight of the vehicle and the pitch of the vehicle, the brake capacity and/or brake metering of the at least one brake device.

19. The method of claim 18, further comprising:
- determining, by the controller and based on speed input provided to the controller subsequent to the stopping distance calculation, whether the speed of the vehicle has increased; and
- adjusting, selectively by the controller and in response to the determination associated with the speed of the vehicle, the brake capacity and/or brake metering of the at least one brake device.

20. A vehicle comprising:
a main frame;
a work implement supported by the main frame and configured to carry a payload in use of the vehicle; and
a control system supported by the main frame and configured to control operation of the vehicle, wherein the control system includes a payload measurement system configured to provide payload input indicative of a variable payload carried by the work implement in use of the vehicle, at least one vehicle speed sensor configured to provide speed input indicative of a speed of the vehicle in use thereof, at least one vehicle orientation sensor configured to provide orientation input indicative of a pitch of the vehicle that is defined by positional characteristics of multiple sections of the vehicle relative to a pitch axis, and a controller coupled to the payload measurement system, the at least one vehicle speed sensor, and the at least one vehicle orientation sensor, wherein the controller includes a processor and a memory device coupled to the processor that has instructions stored therein, and wherein the instructions stored in the memory device are executable by the processor to cause the processor to receive the payload input, the speed input, and the orientation input, to determine a total weight of the vehicle based on the payload input and a base weight of the vehicle, to determine a kinetic energy of the vehicle based on the determined total weight, the speed input, and the orientation input, to determine a braking capacity of at least one brake device of the vehicle, and to calculate a stopping distance of the vehicle based on the determined kinetic energy of the vehicle and the determined brake capacity of the at least one brake device of the vehicle.

* * * * *